United States Patent [19]

Mensch, Jr.

[11] Patent Number: 5,123,107
[45] Date of Patent: Jun. 16, 1992

[54] TOPOGRAPHY OF CMOS MICROCOMPUTER INTEGRATED CIRCUIT CHIP INCLUDING CORE PROCESSOR AND MEMORY, PRIORITY, AND I/O INTERFACE CIRCUITRY COUPLED THERETO

[76] Inventor: William D. Mensch, Jr., 1924 E. Hope St., Mesa, Ariz. 85203

[21] Appl. No.: 368,826

[22] Filed: Jun. 20, 1989

[51] Int. Cl.⁵ .......................... G06F 1/06; G06F 1/08; G06F 15/20; G06F 1/18
[52] U.S. Cl. .................... 395/800; 364/226.7; 364/226; 364/232.7; 364/232.8; 364/232.9; 364/232.93; 364/270.2; 364/271.4; 364/DIG. 1
[58] Field of Search ................ 341/120; 235/456; 364/200, 900

[56] References Cited

U.S. PATENT DOCUMENTS

| | | | |
|---|---|---|---|
| 3,987,418 | 10/1976 | Buchanan | 364/200 |
| 4,275,380 | 6/1981 | Gardner et al. | 235/456 |
| 4,291,319 | 9/1981 | Carinalli | 357/13 |
| 4,652,992 | 3/1987 | Mensch, Jr. | 364/200 |
| 4,739,475 | 4/1988 | Mensch, Jr. | 364/200 |
| 4,787,064 | 11/1988 | Wagner | 364/900 |
| 4,802,120 | 1/1989 | McCoy | 364/900 |
| 4,942,550 | 7/1990 | Murray | 364/900 |
| 4,989,002 | 1/1991 | Tan | 341/120 |

Primary Examiner—Thomas C. Lee
Assistant Examiner—Daniel Pan
Attorney, Agent, or Firm—Cahill, Sutton & Thomas

[57] ABSTRACT

The topography of a CMOS microcomputer chip includes first, second, third, and fourth consecutive edges, with chip control logic being located along the upper left edge. Five peripheral I/O port buffer circuits are located around the edge of the periphery of the chip, except for an eight bit peripheral output port located along the lower right edge and multiplexed with chip select outputs. The microcomputer includes an eight bit W65CO2S CMOS microprocessor, 192 bytes of SRAM, 4096 bytes of SROM, 22 edge interrupt inputs, 3 level-sensitive interrupt inputs, a UART, serial interface buffer for effectuating correction to a local area token passing network, four timers, and priority interrupt control circuitry. The topography is arranged to provide convenient connection of terminals of the microcomputer when it is used as a "core" of a larger computer system chip including an external memory system, a serial communication system, and an interrupt and I/O system. Static bus holding devices are connected to the memories on which I/O terminals are connected, and allow the microprocessor to interpret trinary logic states presented to the I/O port leads by external devices.

15 Claims, 16 Drawing Sheets

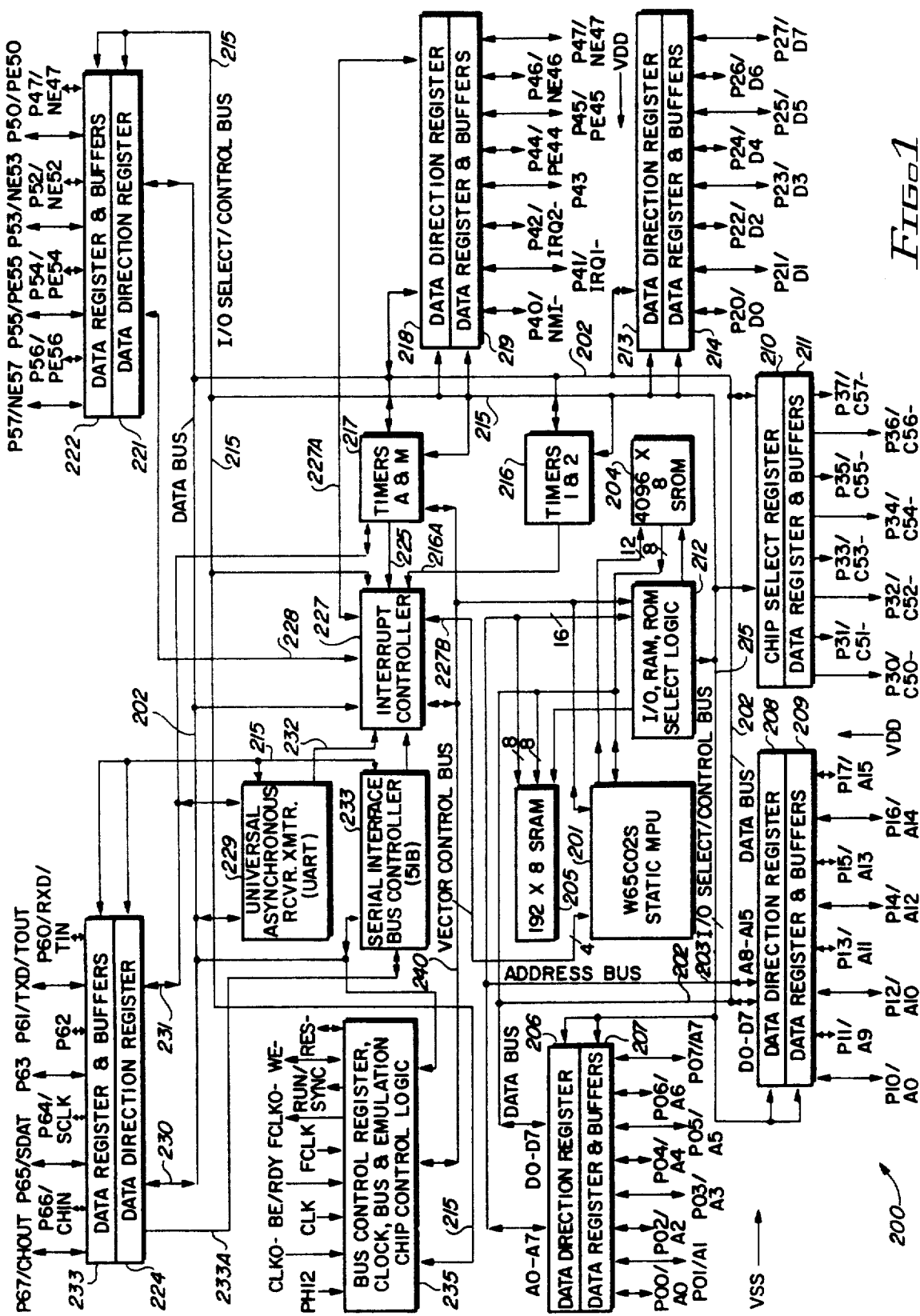

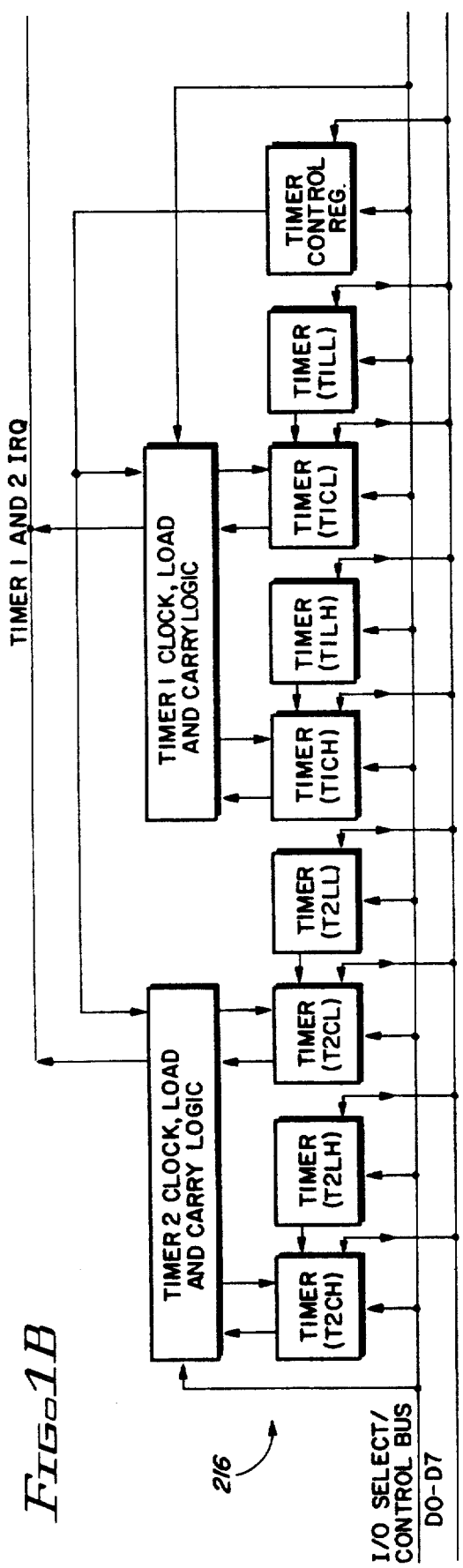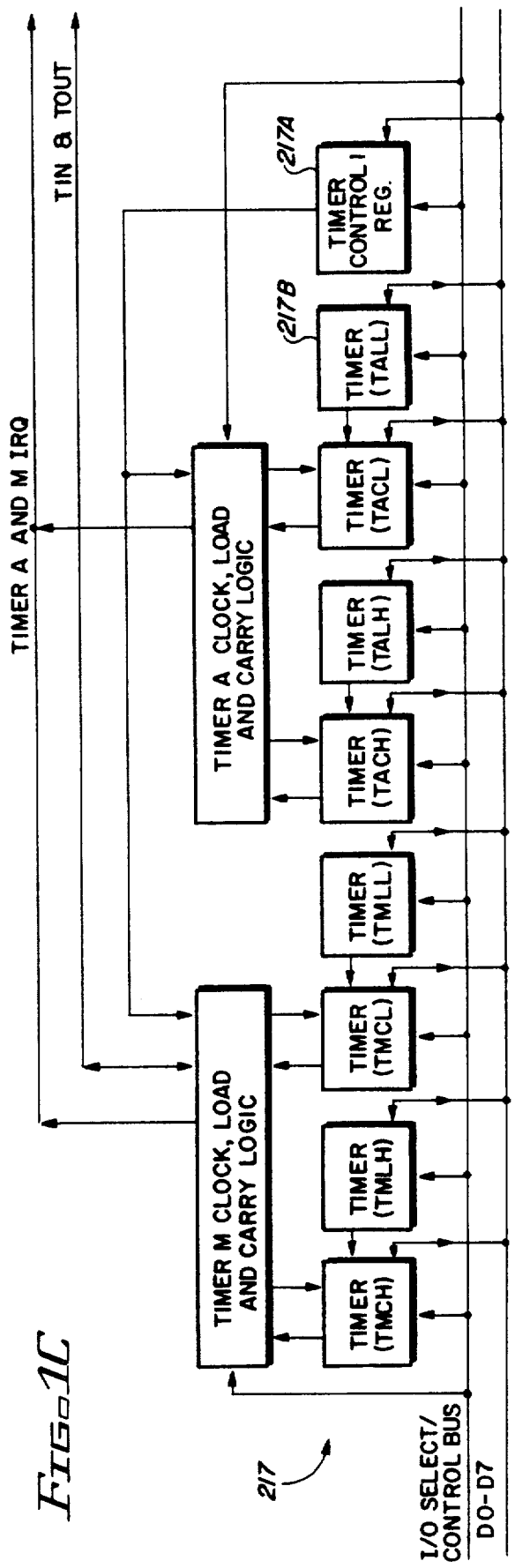

TOPOGRAPHY OF CMOS MICROCOMPUTER INTEGRATED CIRCUIT CHIP INCLUDING CORE PROCESSOR AND MEMORY, PRIORITY, AND I/O INTERFACE CIRCUITRY COUPLED THERETO

BACKGROUND OF THE INVENTION

The invention relates to an efficient topography for a CMOS microcomputer including an eight bit CMOS microprocessor, 4096 bytes of ROM, 192 bytes of RAM, eight chip select outputs, two 16 bit timers, a serial interface bus circuit configured for connection to a token passing local area network, a UART, a watchdog timer with restart interrupt capability, 22 priority encoded interrupts, a toolbox emulation interface, real time clock features, a bus control register for external memory bus control, and interface circuitry for I/O devices.

U.S. Pat. Nos. 4,652,992 and 4,739,475 fully describe the topography and logic circuitry of commercially available processors known as the W65C02 and W65C816 microprocessors, respectively. Microprocessors generally contain an internal address bus, an internal data bus, a number of registers including an accumulator, a program counter, an internal data latch, stack pointer registers, index registers, an arithmetic logic unit, an instruction register, a status register, and instruction decoding circuitry, register transfer logic, and data buffer latches and address latches. Microprocessors do not ordinarily contain additional components that are needed in a microcomputer system, such as a read only memory for storing programs, a random access memory for storing variables and data, timers, UART's, I/O functions, priority interrupt systems and the like. However, with the wide availability and commercial success of quite a number of microprocessors, various suppliers have begun using commercially available microprocessor designs as the "cores" of larger microcontrollers or microcomputers on single silicon chips that include not only the microprocessor, but some or all of the above-mentioned components and others.

The foregoing integrated circuit topography design considerations and constraints make it a considerable challenge to design a microcomputer or microcontroller utilizing an already designed layout for the microprocessor "core" section. Positioning of the core microprocessor, the ROM, RAM, UART, timers, bus control register, and interface circuitry, etc. must be accomplished in such a way as to allow the microprocessor to interface easily on a printed circuit board with other ASIC's (applications specific integrated circuits) designed by the user to implement a larger system. Difficult tradeoffs must be established between the often opposing objectives of (1) minimizing total semiconductor area occupied by the microcomputer and (2) making connection to many leads of the microcomputer which have to be located in certain positions for reasons that have nothing to do with minimizing microcomputer chip area.

The closest prior art known to me is the W65C124 microcontroller, which I designed now and market through my company, The Western Design Center, Inc. of Mesa, Ariz. The function and topography of the W65C124 did not succeed in adequately meeting the objectives of a general purpose microcomputer that can be easily interfaced to a wide variety of ASIC's or other circuitry likely to be required by a user in implementing a larger microcomputer system. The development of the WC65124 circuit and attempts to use that as a "core" microcomputer for even larger microcomputer systems led to the present invention, which is an expanded capability microcomputer that provides an optimum amount of microcomputer function in a relatively small amount of silicon chip area, and provides an optimum interfacing configuration to external memory, I/O, register, interrupt, and serial communications circuitry with minimum chip area and minimum difficulty in routing conductors to various external circuits.

There is a presently unmet need for an efficient topography for a microcomputer including the W65C02's or other CMOS microprocessor and a variety of peripheral ROM, RAM, UART, priority interrupt, and other functions on a single chip. There also is a need for a microcontroller topography which can be efficiently used as the "core" of a larger monolithic microcomputer integrated circuit.

SUMMARY OF THE INVENTION

Accordingly, it is an object of the invention to provide an economical topography for a CMOS microcomputer utilizing a 6502 type eight bit microprocessor core and including ROM, RAM, UART, I/O interface, priority interrupt, timer, and peripheral interface circuitry arranged to minimize chip area and optimize connection of the microcomputer circuitry to logic circuitry with which the microcomputer must be interfaced.

It is another object of the invention to provide an integrated circuit microcomputer having peripheral circuitry that is arranged so as to minimize chip area of a larger semiconductor chip utilizing the microcomputer as a "core", the larger chip including I/O circuitry, interrupt circuitry, and external memory circuitry.

It is another object of the invention to provide a microcomputer chip which is capable of operating at very low dynamic power levels and also is able to operate at very high speeds.

It is another object of the invention to provide a microcomputer that is capable of serving not only as a "core" of a larger microcomputer system, but also is able to function as a "master", rather than a "slave" to the larger microcomputer system.

It is another object of the invention to provide a microcomputer chip that has a very wide range of capabilities for interfacing as a "core" to a larger microcomputer system by providing a large number of positive and negative going edgesensitive interrupts, level-sensitive interrupts, serial communications capability, and extensive external memory addressing capability.

It is another object of the invention to provide a microcomputer that functions more effectively and efficiently as a "core" of a larger microcomputer system than the W65C124 microcomputer.

It is another object of the invention to provide a microcomputer on a semiconductor chip having the capability of greatly reducing power consumption under software control.

It is another object of the invention to provide a microcomputer system which is capable of recognizing trinary logic states produced by external devices connected to buses of the microcomputer chip.

Briefly described. and in accordance with one embodiment thereof, the invention provides an integrated circuit CMOS microcomputer including having first, second, third, and fourth consecutive edges, a microprocessor, address buffer circuitry located along a lower left edge and a bottom edge of the microprocessor, data bus buffers located along a right hand edge of the microcomputer, a plurality of low order external address buffer circuits located along a lower part of the first edge, adjacent to low order address buffers within the microprocessor, a plurality of high order external address buffer circuits located along a left part of the second edge, adjacent to high order address buffers within the microprocessor, chip selection output circuitry located along a right part of the second edge, a plurality of external data bus buffer circuits located along a lower part of the third edge, a plurality of interrupt circuits located along an upper part of the third edge and a right part of the fourth edge, a chip control circuit located along an upper part of the first edge, a first internal memory located between the data bus buffer circuit means and the microprocessor above the chip select output circuit means, a second internal memory located directly above and adjacent to the microprocessor, and a plurality of I/O interface circuits located along the first, second, third, and fourth edges except along the right part of the second edge occupied by the chip select output circuits and the upper part of the first edge occupied by the chip control circuit. In the described embodiment, a UART is located below the I/O interface circuits along the left part of the fourth edge. A plurality of timers are located adjacent to the I/O interface circuits along the right part of the fourth edge and the upper part of the third edge. The chip selection circuit includes a plurality of decoded chip select outputs and a memory map decoder located along the right part of the second edge for effectuating efficient selection of various size blocks of memory. In one embodiment, the microcomputer is used as a core of a larger microcomputer system chip including an external memory system located adjacent to the lower part of the first edge, the entire second edge, and the lower part of the third edge. An interrupt and I/O system is located along the upper part of the third edge and the right part of the fourth edge. A serial communication system is located along the upper part of the first edge and the left part of the fourth edge. This system provides optimum routing of conductors to a large number of interrupt inputs and a large amount of external memory from the microcomputer core. The serial communication system allows the microcomputer chip to be utilized for serial communications with other with remote UART's and allows the microcomputer system chip to be connected to a token passing local area network. Static bus holding devices each consisting of a high impedance static latch are connected to each of the peripheral I/O terminals of the microcomputer. This allows operation of the microprocessor to recognize trinary logic states maintained on the peripheral I/O leads by external devices, wherein a "1" represents a "high" level maintained on the I/O lead by the external device, a "0" is represented by a "low" level forced by external device on the I/O lead, and a third logic level is represented by a high impedance state presented to the I/O lead by the external device. The third trinary logic state is detected by operating the microprocessor to first read the present level being maintained on the I/O lead by the bus holding device, forcing the opposite state onto the I/O lead, and then reading the state of the I/O lead to determine if the bus holding device is now holding the I/O lead at that level, and if it is, the external device is presenting the third trinary level to the I/O lead.

BRIEF DESCRIPTION OF THE DRAWINGS

FIG. 1 is a block diagram showing the architecture of the microcomputer of the present invention.

FIGS. 1A-1I are detailed logic diagrams of various blocks in FIG. 1.

FIG. 2 is a diagram illustrating the relative locations of the 68 leads of the microcomputer of FIG. 1.

FIGS. 5A-5H are scale computer plates of photomasks used to pattern the various integrated circuit layers during the manufacture of the CMOS microcomputer.

DETAILED DESCRIPTION OF THE PREFERRED EMBODIMENT

Figure 1A:
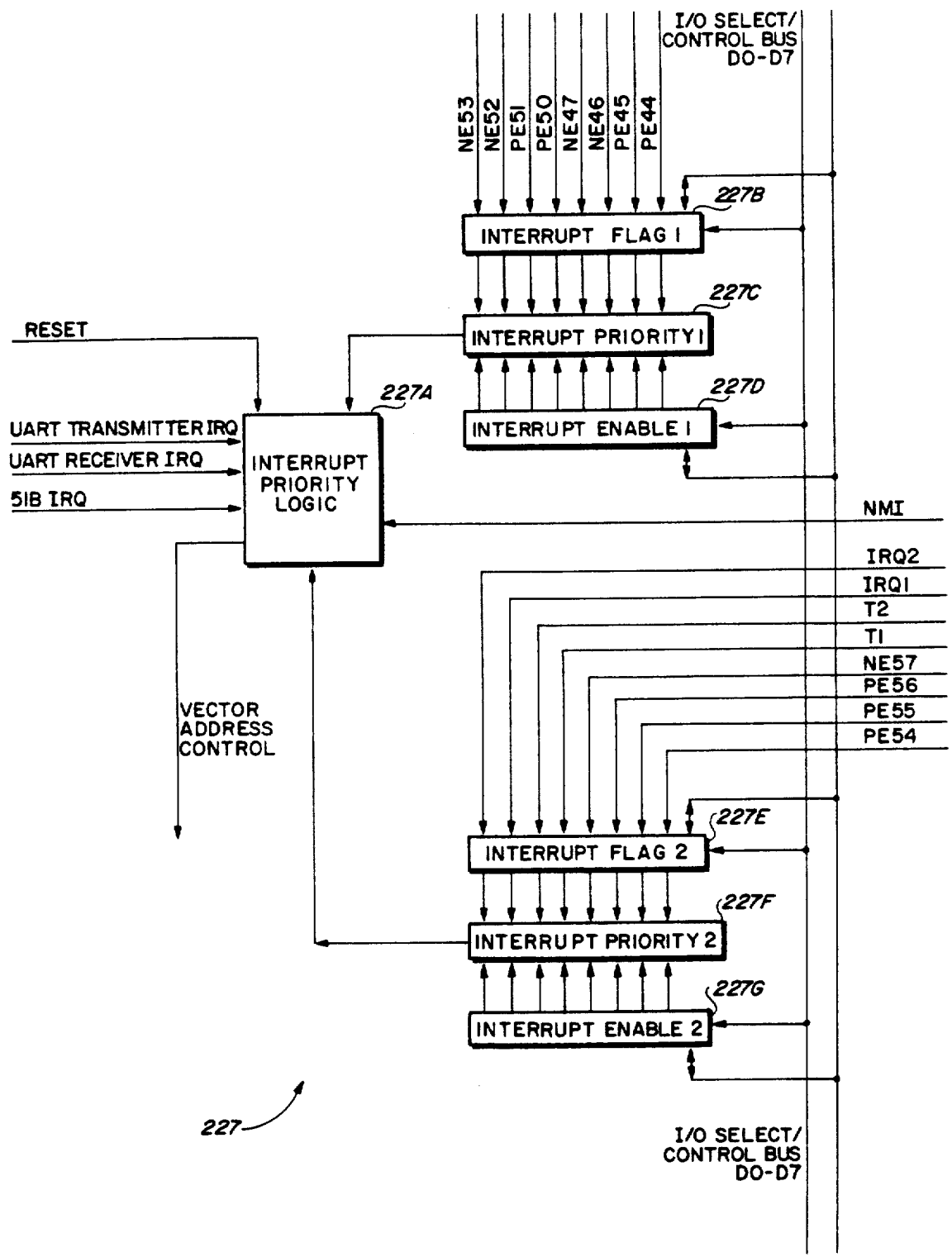

The block diagram of FIG. 1 shows a CMOS microcomputer 200 which includes a microprocessor 201, a 192 word by eight bit static RAM 205, a 4096 word by eight bit static ROM 204, and I/O RAM and ROM select logic 212. Microcomputer 200 also includes data register 207 and data direction register 206 for I/O Port 0 terminals P00-P07, and address latches for address bus outputs A0-A7.

Most of the leads of microcomputer 200 have two signals multiplexed thereon. In FIG. 1, slashes (/) separate the names of signals multiplexed onto a particular lead. Accordingly, a particular lead will be referred to by the name of the particular signal presently being discussed. Data register 209 and data direction register 208 are provided for I/O Port 1 leads P10-P17, and address latches are provided for address outputs A8-A15. Data direction register 210 and data register 211 are provided for outputs P30-P37, and latches are provided for chip select outputs CS0-CS7. Data direction register 213 and data register 214 coupled are provided for I/O Port 2 conductors P20-P27, and data input/output latches are provided for data bus conductors D0-D7.

Microcomputer 200 also includes data direction register 218 and data register 219 for I/O Port 4 conductors P40-P47, and input buffers for level-sensitive interrupt inputs NMI, IRQ1, IRQ2, and to edge-sensitive interrupt inputs PE44, PE45, NE46, and NE47. Data direction register 221 and data register 222 are coupled to I/O Port 5 conductors P50-P57, and input buffers are provided for edge-sensitive interrupt inputs PE50, NE52, NE53, PE54, PE55, PE65, and NE57, respectively. Edge-sensitive input NE47 is multiplexed with an I/O port signal P47. Microcomputer 200 also includes data direction register 214 and data register 223 which are coupled to conductors on which signals TIN, TOUT, P62, P63, SCLK, SDAT, CHIN, CHOUT are multiplexed with various ones of the signals TXD, RXD, P61, P60, P64, P65, P66, and P67 as indicated.

Microcomputer chip 200 also includes a universal asynchronous receiver transmitter (UART) 229. Block 235 includes a bus control register, clock circuitry, bus control circuits, and emulation chip control logic circuitry. Block 235 is connected to the signals RES, WE, RUN/SYNC, FCLK0, FCLK, BE/RDY, CLK, CLK0, and PHI2. Microcomputer 200 further includes a serial interface bus controller circuit 233, interrupt controller circuitry 227, a block 217 containing Timer A and Timer M, and a block 215 including Timer 1 and Timer 2.

Data bus 202 is connected to microprocessor 21, static RAM 205, all of the data direction registers, interrupt controller 227, UART 229, and serial interface bus controller 223. The address bus 203 is connected to data direction registers 206 and 208, to the static RAM 205, static ROM 204, and I/O, RAM, ROM select logic 212. I/O select control bus 215 is connected to RAM, I/O, RAM, ROM select logic in block 212, to all of the data direction registers and data registers, and to block 235.

Interrupt controller 227 is connected by conductors 228 and 227A to data direction registers 221 and 228, by conductors 240 to chip control block 235, by conductors 232 to UART 229, by conductors 225 to timers A and M in block 217, by conductors 227B to microprocessor 201, and by conductors 240 to select logic 212 and to microprocessor 201. Serial interface bus controller 233 is connected by conductors 233A to data direction register 224. Microprocessor 201 is essentially identical to a W65C02S CMOS microprocessor marketed by the Western Design Center, Inc. of Mesa, Ariz. The structure and topography of the W65C02S microprocessor are described in detail in my U.S. Pat. No. 4,652,992, filed Sept. 20, 1983, issued on Mar. 24, 1987, entitled "TOPOGRAPHY OF INTEGRATED CIRCUIT CMOS MICROPROCESSOR CHIP", and incorporated herein by reference.

Figure 1D:
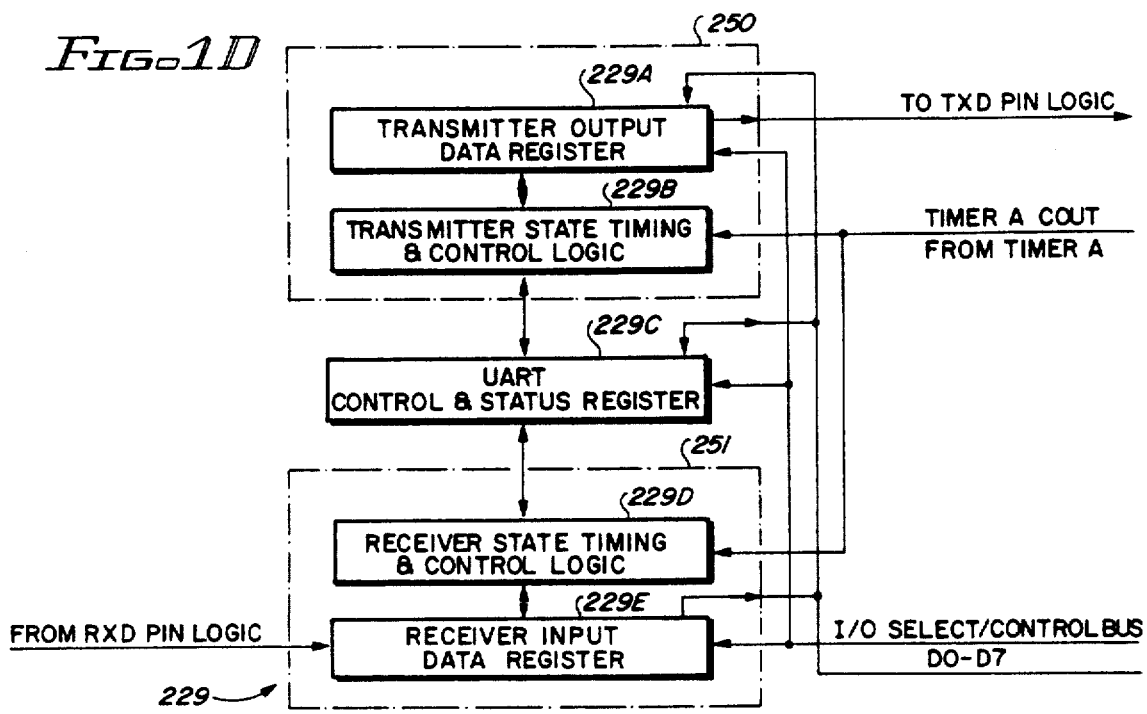
Figure 1E:
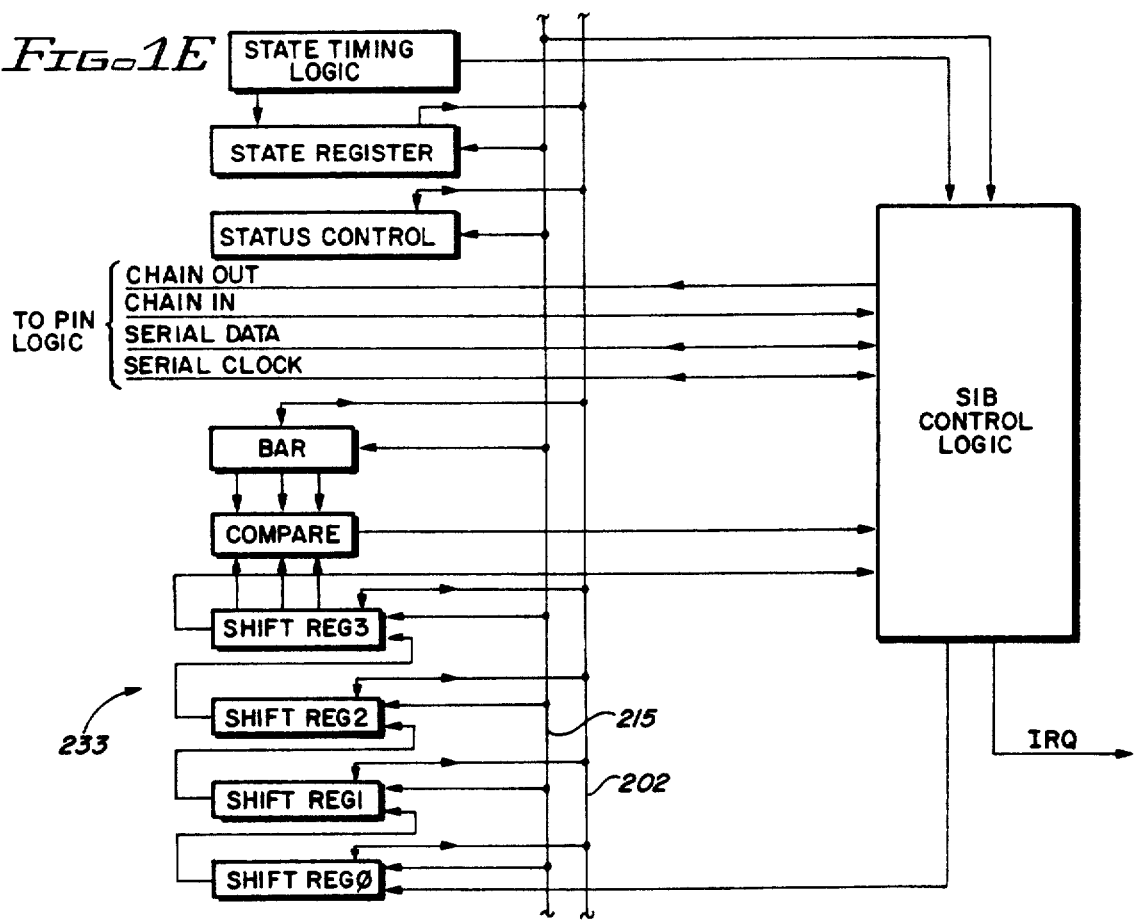
Figures 1F, 1I, 2:
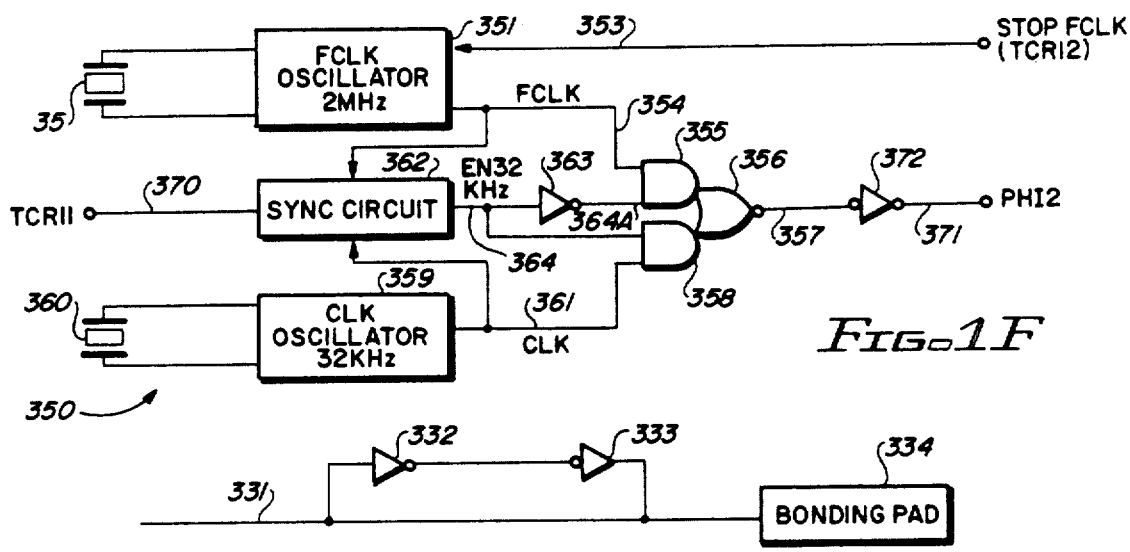

Microcomputer 200 is fabricated on a single chip, composed entirely of CMOS circuitry, and packaged in the 68 lead package or chip carrier represented by the diagram of FIG. 2. Microcomputer 200 also can be used as the "core" 200A of a larger microcomputer system 300 that is implemented on a single silicon chip as explained later with reference to FIG. 3A.

Before describing the topography of microcomputer 200, the main functional blocks thereof will be described, and the functions of package leads 1-68 also will be described.

4096 byte ROM 204 contains user program instructions and fixed constants which are mask-programmed into ROM 204 during fabrication. 192 byte static RAM 205 contains the user program stack and also is used as a scratch pad memory during system operations. SRAM 205 is assigned to both page zero memory addresses $0040 to $00FF and to page one stack addresses $0140 to $01FF.

A bus control register in block 235 is located at memory address $001B, and controls various modes of I/O (input/output) and external memory interface. The voltage of the BE/RDY lead during power-up determines the initial values of bits in the bus control register to set up microcomputer 200 for in-circuit emulation or test modes, if desired. Bit 0 of the bus control register determines if the leads of I/O ports 0, 1, and 2 are to function as I/O port leads or as address bus and data bus leads for external memory or external I/O access. Bit 1 of the bus control register determines whether the package leads 58-61 act as edge-sensitive interrupt inputs or as I/O leads P44-P47.

Bit 2 of the bus control register determines whether the serial interface bus is enabled, and bit 3 determines if the microcomputer operates in an emulation mode in which all internal memory or I/O read data or write data is output on the data bus D0-D7. Bit 4 of the bus control register determines if package leads 62-65 function as I/O leads P50-53 or as edge-sensitive interrupt inputs PE50, PE51, NE52, and NE53. Bit 5 determines whether package leads 66-68 and package lead 1 function as I/O leads P54-P57 or edge-sensitive interrupt inputs PE54, PE55, and PE56. Bit 6 determines if package leads 54-56 function as I/O leads P40-P42 or as non-maskable interrupt (NMI) or interrupt request inputs IRQ1 or IRQ2, respectively. Finally, bit 7 of the bus control register determines whether internal or external ROM is enabled in the address range $F000-FFFF.

Timer A and Timer M in block 217 of FIG. 1 and also Timer 1 and Timer 2 in block 216 are decremented by negative timer clock edges. Timer 1 and Timer 2 can be "enabled" into a prescaler mode to function as N/N+1 prescalers. When Timer M is decremented to zero, it sets its interrupt flag to "1". If the interrupt flag is enabled, microprocessor 201 is interrupted and control is transferred to a vector associated with the interrupt. When the monitor watchdog Timer M times out, microprocessor 201 is restarted, and Timer M is reinitialized. A write operation to Timer 1 or Timer 2 involves writing the data to the associated timer latch from the data bus of microprocessor 201. The associated timer counter is loaded from its associated timer latch.

Interrupt flag registers in interrupt controller 227 contain a bit which is set in response to a signal from a source which may be specified as level triggering or edge-triggering. A read from an interrupt flag register transfers its value to the internal data bus 202. A write of a "1" to any bit of the internal flag registers clears that bit. If more than one bit of an interrupt flag register is set and enabled, a vector corresponding to the highest bit number set is used to thereby establish interrupt priority.

Interrupt registers in block 227, when read, output their contents onto the internal data bus 202. Writing an interrupt enable register in block 227 writes a value from the internal data bus 202 into the interrupt enable register. Setting a bit in an interrupt enable register to a "1" permits the corresponding bit in the interrupt flag register to interrupt microprocessor 201.

Timer A provides clock timing for the asynchronous I/O data and establishes the data rate for the asynchronous serial I/O ports TXD and RXD. Timer A operates as configured by a timer control register in area 121 of FIG. 3, subsequently described, which is set up prior to enabling UART 229.

UART 229 is a full duplex universal asynchronous receiver/transmitter with programmable bit rates. Its block diagram is shown in FIG. 1D, subsequently described. Its serial input and output functions are controlled by the asynchronous control and status register (ACSR) 229C of FIG. 1D. The serial bit rate of UART 229 is determined by timer A such that all transmitter and receiver bit rates occur at one-sixteenth of the timer A interval timer rate.

The serial interface bus circuit 233, shown in FIG. 1E, is configured as a token passing local area network, and is intended for inter-chip communications in parallel processing applications. Four leads are associated with its use, namely those conducting the CHIN, CHOUT, SDAT, and SCLK signals. The serial interface bus circuit 233 has seven registers associated with its use, namely the STATE, SR0, SR1, SR2, SR3, SCSR, and BAR registers.

Table 1 below lists the package lead numbers 1-68 of the microcomputer, and identifies the one or two signals multiplexed onto each of package leads 1-68, and also identifies the bit of the bus control register, asynchronous control and status register, etc. which determines which of the two identified signals is in effect. "BCRx" refers to bit x in the bus control register. "ACSRx" refers to bit x in the asynchronous control and status register 229C of FIG. 1D. "TCRx" refers to bit x in the timer control register. "PCSx" refers to bit x of the programmable chip select register in block 210 of FIG. 1. The PCSx bit determines whether package leads 37-44 function as programmed outputs or chip select outputs.

TABLE 1

| PIN | NAME | CONTROL BIT |
|---|---|---|
| 1 | P57/NE57 | BCR5 |
| 2 | P60/RXD/ TIN | ACSR5 TCR14 |
| 3 | P61/TXD/ TOUT | ACSR0 TCR15 |
| 4 | P62 | — |
| 5 | P63 | — |
| 6 | P64/SCLK | BCR2 |
| 7 | P65/SDAT | BCR2 |
| 8 | P66/CHIN | BCR2 |
| 9 | P67/CHOUT | BCR2 |
| 10 | RES- | — |
| 11 | WE- | — |
| 12 | RUN/SYNC | BCR3 |
| 13 | FCLK0- | — |
| 14 | FCLK | — |
| 15 | BE/RDY | — |
| 16 | CLK | — |
| 17 | CLK0- | — |
| 18 | PHI2 | — |
| 19 | P00/A0 | BCR0,3,7 |
| 20 | P01/A1 | BCR0,3,7 |
| 21 | P02/A2 | BCR0,3,7 |
| 22 | P03/A3 | BCR0,3,7 |
| 23 | P04/A4 | BCR0,3,7 |
| 24 | P05/A5 | BCR0,3,7 |
| 25 | P06/A6 | BCR0,3,7 |
| 26 | P07/A7 | BCR0,3,7 |
| 27 | VSS | — |
| 28 | P10/A8 | BCR0,3,7 |
| 29 | P11/A9 | BCR0,3,7 |
| 30 | P12/A10 | BCR0,3,7 |
| 31 | P13/A11 | BCR0,3,7 |
| 32 | P14/A12 | BCR0,3,7 |
| 33 | P15/A13 | BCR0,3,7 |
| 34 | P16/A14 | BCR0,3,7 |
| 35 | P17/A15 | BCR0,3,7 |
| 36 | VDD | — |
| 37 | P30/CS0- | PCS30 |
| 38 | P31/CS1- | PCS31 |
| 39 | P32/CS2- | PCS32 |
| 40 | P33/CS3- | PCS33 |
| 41 | P34/CS4- | PCS34 |
| 42 | P35/CS5- | PCS35 |
| 43 | P36/CS6- | PCS36 |
| 44 | P37/CS7- | PCS37, BCR7 |
| 45 | P20/D0 | BCR0,3,7 |
| 46 | P21/D1 | BCR0,3,7 |
| 47 | P22/D2 | BCR0,3,7 |
| 48 | P23/D3 | BCR0,3,7 |
| 49 | P24/D4 | BCR0,3,7 |
| 50 | P25/D5 | BCR0,3,7 |
| 51 | P26/D6 | BCR0,3,7 |
| 52 | P27/D7 | BCR0,3,7 |

TABLE 1-continued

| PIN | NAME | CONTROL BIT |
|---|---|---|
| 53 | VSS | — |
| 54 | P40/NMI- | BCR6 |
| 55 | P41/IRQ1- | BCR6 |
| 56 | P42/IRQ2- | BCR6 |
| 57 | P43 | — |
| 58 | P44/PE44 | BCR1 |
| 59 | P45/PE45 | BCR1 |
| 60 | P46/NE46 | BCR1 |
| 61 | P47/NE47 | BCR1 |
| 62 | P50/PE50 | BCR4 |
| 63 | P51/PE51 | BCR4 |
| 64 | P52/NE52 | BCR4 |
| 65 | P53/NE53 | BCR4 |
| 66 | P54/PE54 | BCR5 |
| 67 | P55/PE55 | BCR5 |
| 68 | P56/PE56 | BCR5 |

Figure 3A:
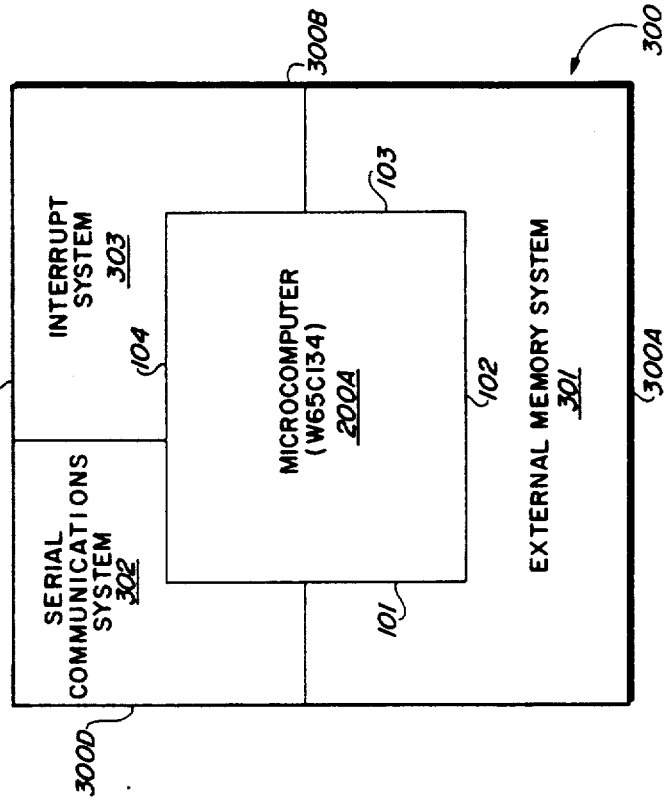
FIG. 3A is a block diagram of the topography of a larger microcomputer system including the microcomputer of the present invention used as a "core" around which the larger microcomputer system is fabricated on a single semiconductor chip.

Next, the lead or pin functions for the microcomputer 100 will be described, and where applicable, their relationship to the chip topography shown in FIGS. 3 and 3A and in FIG. 4 will be explained.

Figure 3:
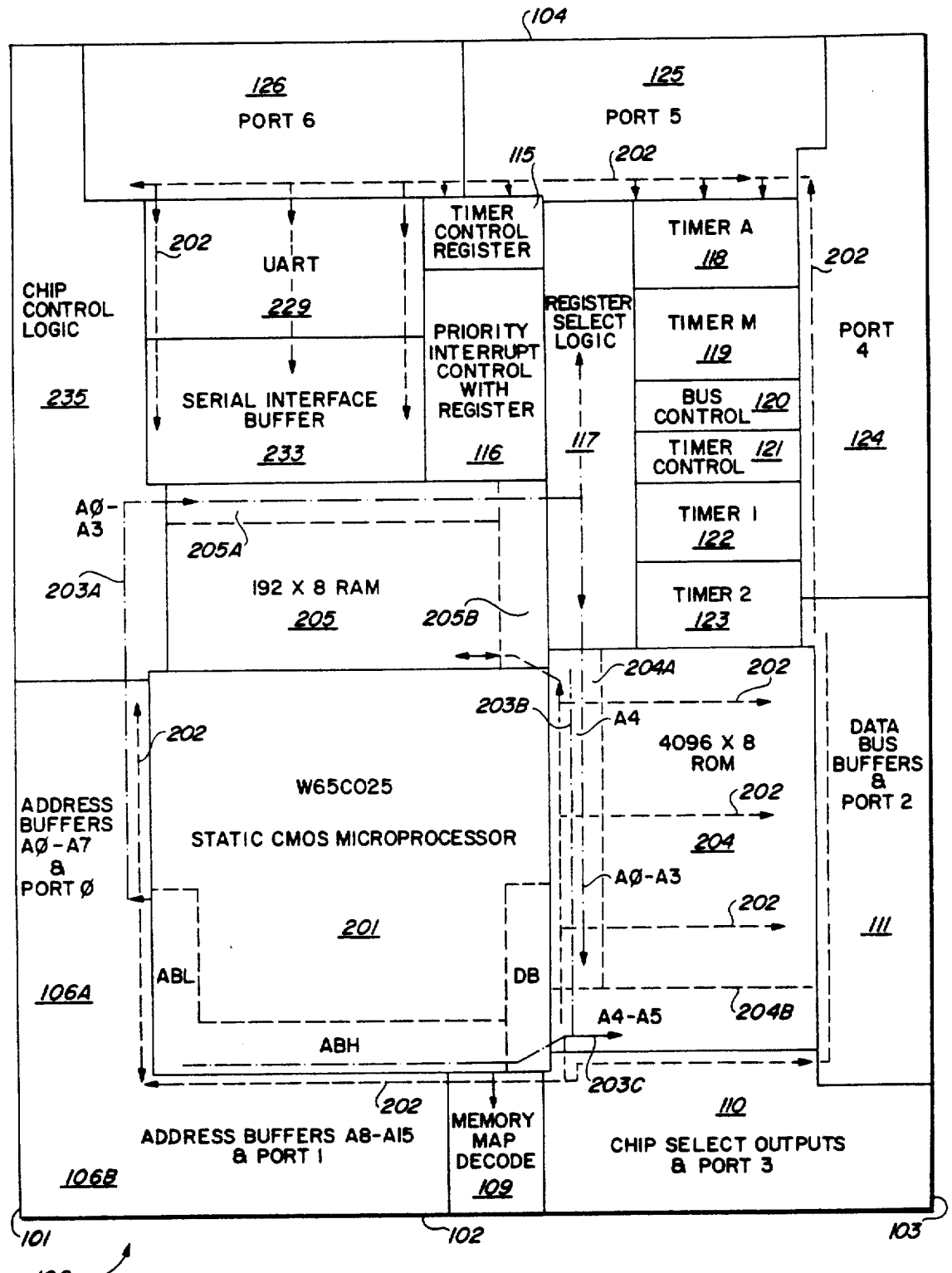
FIG. 3 is a block diagram generally illustrating locations of major circuit sections of the CMOS microcomputer of FIG. 1 on a semiconductor chip.
Figure 4:
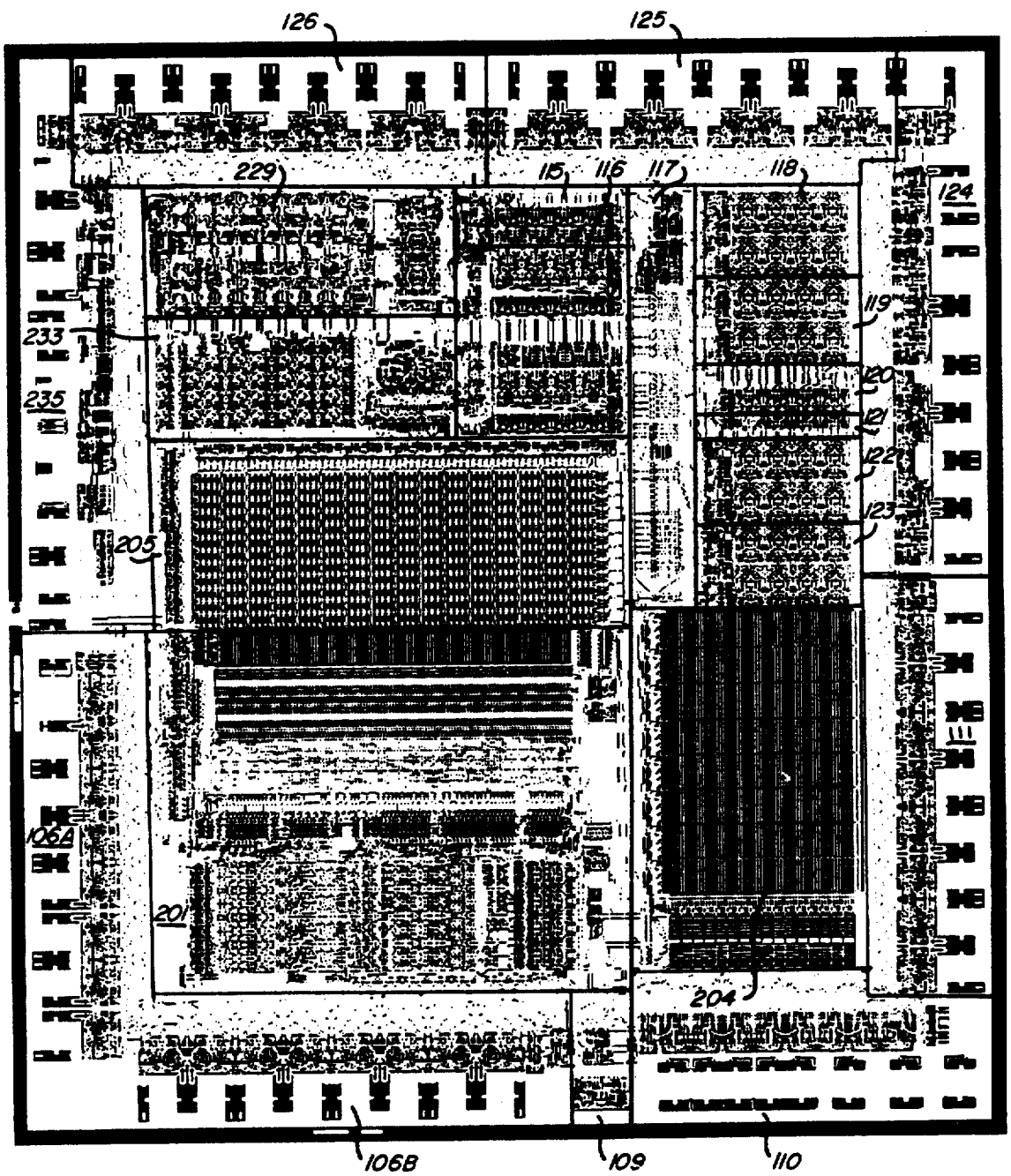
FIG. 4 is a diagram of the contacts mask layer for fabrication of the microcomputer of FIG. 3, with the blocks of FIG. 3 superimposed thereon.

The WE (write enable) signal is defined as "active low", and is an output with a "high" or "1" level when microprocessor 201 is reading data from an external memory or external I/O not present on microcomputer chip 200A (FIG. 3). WE also is at a high level when it is reading or writing to internal memory, i.e., to SRAM 205, SROM 204, or internal (on-chip) I/O circuits on chip 200A. When the WE input is low, microprocessor 201 is writing to external memory or external I/O. The WE signal is bi-directional, so that when the BE/RDY lead is low, the WE signal is an input for DMA (direct memory access) operations to SRAM 205, ROM 204, on-chip registers, or on-chip I/O (i.e., the I/O port buffers). When the BE/RDY lead is at a high level, microprocessor 201 controls the WE lead as an output.

The RUN/SYNC lead 12 goes low when the microprocessor 201 is stopped as a result of a WAI (wait) or STP (stop) instruction, and goes high when the microprocessor 201 is running. The RUN/SYNC lead is utilized, for example, to signal an external oscillator and clock system to start FCLK or CLK. When bit 3 of the bus control register is set, the "sync" function causes lead 12 to be pulled to a high level when PHI2 is at its low level. When bit 3 of the bus control register is at a low level(for the normal operating mode) the RUN function, the RUN/SYNC lead 12 is at a high level during the entire PHI2 clock cycle. When RUN/SYNC lead 12 is low, the PHI2 clock signal may be stopped. Execution of a WAI instruction pulls RUN/SYNC lead 12 low when PHI2 is high, and it stays low until an enabled interrupt is requested or until the RES (reset) lead 10 goes from a low to a high level, starting microprocessor 201. The STP (stop) instruction pulls RUN/SYNC lead 12 low when PHI2 is high and stops the internal PHI2 clock. The RUN/SYNC lead 12 remains low and the internal PHI2 clock remains stopped until an enabled interrupt is requested or RES lead 10 goes high.

The FCLK (fast clock) lead 14 can be started or stopped by writing "0" to Bit 2 in timer control register 217A (i.e., TCR12) of FIG. 1C, and is restarted by writing that bit to a "1". (The slow clock CLK can never be stopped.)

The PHI2 output on lead 18 is the main system clock used by microprocessor 201 for instruction timing, on-chip memory accesses and I/O timing, and also is used by the Timers 1, 2, M, and A. The PHI2 clock signal is set "equal" to either the CLK signal on lead 16 or the FCLK signal on lead 14, depending upon the value of a bit in the timer control register (TCR) 217A in FIG. 1C.

The CLK and FCLK inputs on leads 16 and 14, respectively, are used by the timers for the PHI2 system clock generation, counting events, or implementing real time clock functions. The CLKO and FCLKO outputs on leads 17 and 13, respectively, are the inverted CLK and FCLK inputs that are used for oscillator circuits that employ crystals or other time base.

The BE/RDY (bus enable/ready) input lead 15 controls the address bus, data bus, and WE (write enable) signals. When RE (reset) 10 goes high, signaling the power-up condition, microprocessor 201 starts. If BE/RDY lead 15 goes low when PHI2 is low, the addresses A0-A15 and WE lead 11 are input, allowing DMA (direct memory and I/O access) for emulation purposes. Data from data lines D0-D7 is written to any register being addressed by A0-A15 when WE is low. Data is read from D0-D7 when WE is high. Microprocessor 201 is stopped when BE/RDY is low. When BE/RDY is high, A0-A15, D0-D7, and WE are outputs controlled by microprocessor 201. When BE/RDY is pulled low during PHI2 high time, BE/RDY does not affect the direction of the address bus, data bus, and WE signals. When BE/RDY is pulled low when PHI2 is high, microprocessor 201 is stopped so that it may be "single stepped" (i.e., operated one machine cycle at a time) in emulation mode.

The reset (RES) input/output lead 10, which is defined as active low, stops the entire microcomputer 200 and puts it into a static low power state if RES is low for more than two PHI2 cycles. After such a reset, all I/O leads become inputs, and all input buffers are disabled so that the inputs electrically "float". However, the BE/RDY and WE inputs are unaffected by the RES input. When RES lead 10 goes from a low to a high level, RUN/SYNC lead 12 goes high, and the bus control register in block 235 is initialized to $89 if BE/RDY is low or to $00 if BE/RDY is high. Microprocessor 201 then begins the power-up reset sequence in which its program counter is loaded with a reset vector that points to the first instruction to be executed. RES lead 10 is a bi-directional lead that is pulled low internally for "restarting" due to a "monitor timeout" in which timer M "times out" (i.e. is decremented to zero), thereby causing a system reset.

The Pxx I/O port leads P00-P07, P10-P17, P20-P27, P40-P47, P50-P57, are bi-directional, the Port 3 leads being outputs only. Each bi-directional port has a port data register PDx and a port data direction register PDDx. A "0" in the port data direction register defines the associated I/O port lead as an input with the output driver transistors in an "off" state. A "1" in a port data direction register defines the corresponding I/O port lead as an output. Reading of any port data register involves reading the states of the corresponding I/O port leads. After a reset operation, all I/O port leads become input leads with both the data and data direction registers reset to "0"s.

Port 3 has the above-mentioned chip select register (CSR), that is used to enable chip select leads CSx. The eight chip select signals CS0-CS7 are decoded from the states of various ones of address bus conductors A4-A15. The CS0-CS7 outputs can be used as additional address outputs to select as many as 256 64 kilobyte blocks of memory. A "1" in bit x of the chip select register of Port 3 enables chip select values to be output on the corresponding lead of Port 3. The CS0-CS7 outputs also are used to "map" external memory space into convenient 8 kilobyte, 16 byte, and 32 kilobyte segments, as subsequently explained.

The internal memory mapping allows various ones of the chip select signals CS0-CS7 to be utilized to conveniently select various standard sized blocks of external memory, registers, and input/output circuitry. For example, CS1 and CS2 can be utilized to select 32 bytes, CS3, 4, and 5 can be utilized to select eight kilobyte blocks, and CS6 and CS7 can be utilized to select 32 kilobyte blocks. CS0 can be used to select a 16 byte block. The chip select outputs CS0-CS7 are individually enabled as outputs on Port 3 by the above-mentioned chip select register CSR. CS7 is automatically enabled by PCSR bit 7 being equal to "1". Each of the eight chip select outputs CS0-CS7 is dedicated to one block of external memory. Chip select inputs CS3-CS7 are considered to be clocked chip selects, meaning that they become active only when PHI2 is high. The remaining chip select inputs CS0-CS2 are not clocked and are "active" any time the address bus is in the appropriate memory block. The chip select outputs CS0-CS7 are defined as "active low", i.e., are asserted when at a low level. When the same leads are programmed by data direction register 211 as chip select outputs, they come up at a high level as a result of a chip reset operation. Those skilled in the art will recognize that it is preferable that chip select outputs in any system come up in the right state when the system is initialized.

Port 0 and Port 1 function as address bus ports when the bus control register bits 0 and 7 are set to "1's" and bit 3 is set to "0", for normal operating mode external memory addressing. Address leads A0-A15 are all "1's" when addressing "on-chip" memory. When bit 3 of the bus control register is set to a "1", the address bus is active so that internal read and write operations can be traced in an emulation mode.

Port 2 can be configured as a data bus port (D0-D7) by the bus control register. When bits 0 and 7 of the bus control register are set to a "1", and bit 3 thereof is set to a "0", D0-D7 are all "1's" when microprocessor 201 is addressing on-chip memory. When bit 3 of the bus control register is a "1", the data bus D0-D7 is "active" so that internal read and write operations can be traced.

Edge interrupt leads PE44, PE45, PE50, PE51, PE54, PE55, and PE56 have positive edge-sensitive interrupt inputs multiplexed with the I/O functions. When one of these leads is "enabled" as an edge interrupt, as defined by the bus control register, an interrupt is generated and the associated bit is set by an internal one-shot circuit in the interrupt flag register 227B or 27E of FIG. 1A on a positive transition from a "0" to a "1". The transition from a "1" to a "0" has no effect on the interrupt flag register. When the associated interrupt enable register bit is set to a "1", microprocessor 201 will be interrupted, provided the interrupt flag bit in the microprocessor's internal status register is cleared to a "0". When the interrupt flag bit is a "1", interrupts are disabled.

Similarly, edge interrupt leads NE46, NE47, NE52, NE53, and NE57 have negative edge-sensitive interrupt inputs multiplexed with the I/O functions of these leads. When the lead is defined as an edge interrupt by the bus control register, an interrupt is generated and the associated bit is set by an internal one-shot circuit on a negative transition from a "1" to a "0". The opposite transition has no effect on the interrupt flag register 227B or 227E. When the associated bit of interrupt enable register 227D or 227G of FIG. 1A is set to a "1", microprocessor 201 will be interrupted provided the interrupt flag bit in the internal microprocessor status register is cleared to a "0", and when the interrupt flag is a "1", interrupts are disabled.

I/O port signals P41 and P42 have I/O functions that are multiplexed with the IRQ1 and IRQ2 level-sensitive interrupt inputs on package leads 55 and 56 by bit 6 of the bus control register. When IRQ1 is low the associated interrupt flag is set to a "1" in interrupt flag register 227E. When the associated bit of interrupt enable register 227G is set to a "1", microprocessor 201 will be interrupted, provided its interrupt flag is cleared to a "0" so as to allow interrupts. I/O port lead P40 has its I/O data multiplexed with the NMI (non-maskable interrupt) edge-triggered interrupt and is controlled by bus control register bit 6. When NMI is selected, microprocessor 201 will be interrupted on all negative edges of NMI.

UART 229 has a receiver 251 that is enabled when Bit 5 of Asynchronous Control and Status Register 229C is set to a "1", and package lead 2 becomes the asynchronous receiver input RXD. When transmitter 250 of UART 229 is enabled by Bit 0 of the Asynchronous Control and Status Register 229C, then package lead 3 becomes the asynchronous transmitter output TXD.

A block diagram for Timer A and Timer M is shown in FIG. 1C. Timer A is controlled by the timer control register 217A of FIG. 1C. When UART 229 is not in use, Timer A can be used for counting input negative pulses of TIN (Timer A input) lead 2. Timer A also can be used to generate a square wave or rectangular waveform on TOUT (Timer A output) lead 3. When counting negative pulses on TIN, the TIN frequency should always be less than one-half the frequency of PHI2. TOUT changes state on every timeout of Timer A. Therefore, the varying waveform frequency depends on the Timer A latch values, and may be modified under software control. FIG. 1B shows the block diagram of Timers 1 and 2. All of the watchdog timers are programmed via the data bus. The timer outputs are connected to the interrupt controller, which signals the chip control logic.

The serial interface bus circuit leads include a CHIN (chain input) lead 8 for chain input token passing, which is connected to the CHOUT (chain output) lead of a previous microcomputer in a token passing chain. When the CHIN lead of a microcomputer is high, it indicates that that microcomputer can be a "master", because all other microcomputers between the previous "master" and the present microcomputer are not presently in a "master" role. The CHOUT lead 9 also is utilized for token passing, and passes a token state to the next microcomputer in the local area network connection. The SCLK (serial clock) lead 6 is used for the serial interface bus and is connected to the output of the serial clock generator in the microcomputer in which the clock generator is enabled. It synchronously advances the state machines of the microcomputer for sending and receiving in all microcomputers in the local area network connection, and also shifts data serially from the sending microcomputer to a receiving microcomputer.

The SDAT lead 7 conducts serial data for the serial interface bus and is connected to all microcomputers in the local area network connection. When a message is not being sent, a microcomputer that wants to send a message pulls its SDAT lead low to start its serial clock generator. When a message is being sent, the sending microcomputer uses its SDAT lead to convey data to all other microcomputers on the local area network connection. At the end of the message, the receiving microcomputer uses SDAT to acknowledge reception to the sender or master.

In accordance with the present invention, chip control logic circuitry 235 contains two oscillators, as shown in FIG. 1F. A fast oscillator 351, which may be triggered by a crystal oscillator circuit 35 or other suitable time base, may oscillate at a high frequency rate, for example 2 megahertz. Fast clock oscillator circuit 351 can be stopped by a software controlled input 353, which is connected to Bit 2 of Timer Control Register 1, designated by numeral 217A in FIG. 1C. Fast clock oscillator 35 produces a fast output clock signal FCLK on conductor 354, which is input to a gate circuit which is symbolically illustrated as including two-input AND gates 355 and 358 having their outputs input to a NOR gate 356, the output of which is produced on conductor 357 and inverted again to produce the internal signal PHI2.

Conductor 354 is applied to an input of the synchronizing circuit 362, which generates an enable signal on conductor 364 which is applied to one input of AND gate 358, and also is inverted by inverter 363 and applied to one input of AND gate 355.

A second oscillator, slow oscillator circuit 359, is triggered by a slow crystal circuit 360 at for example, 32 kilohertz. Slow clock oscillator circuit 359 generates a 32 kilohertz squarewave CLK on conductor 361, which is supplied as another input to synchronizing circuit 362.

Figure 1G:
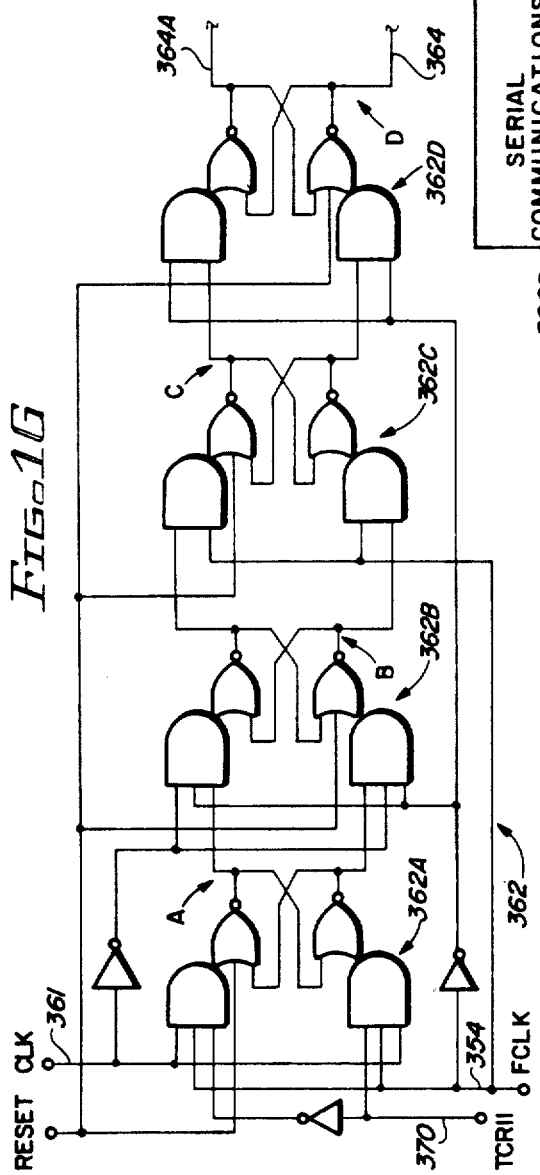

FIG. 1G shows the detailed implementation of synchronization circuit 362. Synchronization circuit 362 includes four gated latches 362A, 362B, 362C and 362D connected in sequence. The output of gated latch 362A is supplied as an input to gated latch 362B. The output of gated latch 362B is input to gated latch 362C, and the output of gated latch 362C is input to gated latch 362D.

One of the outputs of gated latch 362D is connected to conductor 364, and the logical complement of the signal on conductor 364 appears on conductor 364A. (It should be appreciated that the inverter 36 in the simplified schematic diagram of FIG. 1F is shown to perform the function of generating a complementary signal inherently performed by gated latch 362D.) Bit 1 of Timer Control Register 1 (designated by numeral 217A in FIG. 1C) is supplied as a clock select input TCR11 on conductor 370 to synchronization circuit 362.

Figure 1H:
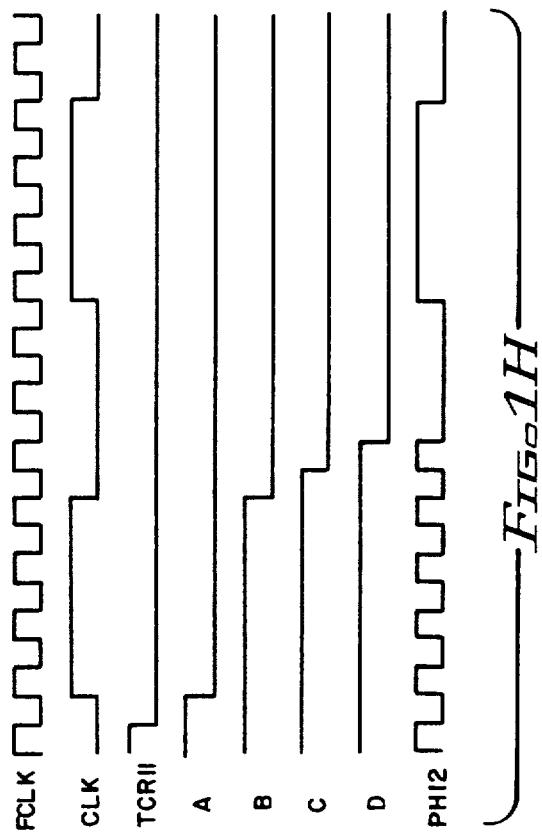

The operation of synchronization circuit 362 is apparent from the waveforms of FIG. 1H, which show the fast clock signal FCLK on conductor 354 and the slow clock CLK signal on conductor 361. If the clock select signal TCR11 goes from a high level to a low level, the four gated latches produce output signals on nodes A, B, C, and D as shown. The signal on node D is applied to conductor 364 and its logical complement is applied to conductor 364A, which are applied to the gate circuit including NAND gates 355 and 358, OR gate 356, and inverter 372 in FIG. 1F, producing the signal pH12 on conductor 371. One skilled in the art can readily deduce the operation when TCR11 goes from a low level to a high level to reselect the fast clock signal, and can determine that synchronization of PHI2 with both FCLK and CLK is maintained.

Conductor 361 is connected to one input of two input NAND gate 358. This dual oscillator arrangement allows the microcomputer 200 to be utilized for very low power consumption applications, wherein the internal clock can be selected to operate at the slow 32 kilohertz rate supplied by slow oscillator circuit 359, greatly reducing AC power dissipation. Whenever high speed operation is needed, the fast clock oscillator 351 can be selected by providing an enable signal on conductor 353 and allowing enough time for the fast oscillator signal to stabilize (typically a few milliseconds) during which the slow clock oscillator signal continues to be produced on conductor 357 and used by the entire microcomputer 200. Then, under software control (Bit 1 of Timer Control Register 1), control of the main system clock signal on conductor 357 is switched over to the FCLK signal produced on conductor 354 by the fast clock oscillator circuitry 351.

The synchronizing circuit requires that the fast oscillator circuit 351 run substantially faster (at least three or four times faster) than the slow clock oscillator circuit 359. The stop SCLK signal on conductor 353 comes from Bit 2 of the TCR1 register, and the enable or oscillator select bit 362A comes from the TCR1 register Bit 1.

In accordance with another aspect of the present invention, a plurality of external "bus holding circuits" such as the one shown in FIG. 11 are connected to various external bus conductors. Each bus holding circuit contains a first low power CMOS inverter 332 having an input connected to an external bus conductor 331 and an output connected to the input of another low power CMOS inverter 333 having its output connected to the external bus conductor 331. The output impedance of inverter 333 is so high (i.e., a few hundred kilohms to several megohms) that the external or internal circuitry connected to the external bus conductor 331 can easily "overpower" inverter 331 and force a changed state. The bus holding circuits, however, ensure that if microcomputer 200 is connected in a configuration in which a particular external bus line is unconnected to anything, a bus holding circuit will hold it in a particular state, preventing anomalous test results due to indeterminate levels on unused external bus conductors when the output driver circuits connected thereto are in high impedance states.

Another advantage to having such bus holding circuits on external bus conductors is that "trinary" logic levels can be utilized. The state of each external bus conductor can be read by microcomputer 200. If an external device holds a "1" on an external bus conductor such as 331, and microcomputer 200 is operated to force a "0" onto external bus conductor 331 momentarily, and then read the state of conductor 331, a "logical" "1" would be detected. (A very narrow pulse could be utilized to accomplish this, minimizing power dissipation.) If the external device connected to conductor 331 connects it through a low impedance path to a "0" level, and microcomputer 200 is operated to momentarily force a "1" on conductor 331, and then again reads the state of conductor 331, a "0" would be obtained. Thus, a "0" or a "1" externally maintained on conductor 331 can be reliably read by microcomputer 200. This is accomplished independently of the bus holding circuit including low power inverters 332 and 333. However, if the output switch or external circuit connected to conductor 331 is in a "tri-stated" or high impedance state, then microcomputer can first force a "1" on conductor 331, subsequently perform a read operation and discover the "1" is still there, because it is being held there by the bus holding circuit. Microcomputer 200 can then force the opposite state on conductor 331, which will be maintained by the bus holding circuit, then perform another read and discover that the state of conductor 331 has not changed. Thus, the third possible state (i.e., the high impedance state) of the external circuit has been reliably determined. This ability to reliably read three different states produced by an external circuit on external bus 321 increases the amount of information that can be read from external bus conductors such as the I/O port conductors.

FIG. 2 shows the "package lead numbers" and multiplexed lead signal assignments for the 68 lead carrier in which the single chip microcomputer 200 can be packaged. FIG. 3 shows the locations of the areas within a single chip or the areas within a "core" area of a larger chip wherein the various blocks in FIG. 1 are located in accordance with the present invention. Where convenient in FIG. 2, areas are designated by the same reference numerals used to designate the circuitry therein. The areas shown in FIG. 3 are also shown superimposed on the polycrystalline silicon mask layer shown in FIG. 4. The chip control logic 114 in FIG. 3 includes circuitry connected to RES (reset) lead 10, the WE (write enable) lead 11, RUN/SYNC lead 12, FCLKO (fast clock out) lead 13, FCLK (fast clock) lead 14, BE/RDY (bus enable/ ready) lead 15, CLK (clock) lead 16, CLKO (clock out) lead 17, and PHI2 output lead 18. Chip control logic 235 is placed along the upper half of edge 101 of the microcomputer chip 100A to allow convenient usage of the topography of microcomputer chip 100A as a "core" of a larger microcomputer system 300 as shown in FIG. 3A, and also to allow the lower part of edge 101 to be used for lower order A0-A7 address buffers. BE/RDY lead 16 and its associated circuitry in section 235 are "sandwiched" between two oscillators connected to FCLK lead 14 and CLK lead 16 to provide electrical isolation between the two. This is important to reduce interaction between the two oscillators. PHI2 lead 18 and its associated circuitry are separated as much as possible from the clock oscillator connected to the CLK lead 16. Similarly, RUN/SYNC lead 12 is separated as much as possible from the fast oscillator connected to FCLK lead 14, in order to isolate the oscillators as much as possible from signals that could produce undesirable "cross-talk" in the fast and slow oscillators.

The "high order" address buffers A8-A15 are laid out in section, 106B of FIG. 3 along the left port of edge 102, and need to be contiguous with lower address buffers A0-A7 in section 106A. Positioning of the $V_{XX}$ lead 27 between the high order address bits A8-A15 and lower order address bits A0-A7, positioning $V_{DD}$ between the high order address buffer section 106B and the chip select circuitry in section 110, and providing a $V_{SS}$ conductor lead 53 on the opposite side of the data bus D0-D7 was done for the purpose of having power supply voltages available where noise would be most likely to be generated by the high frequency charging and discharging transitions that usually take place on the address bus and data bus. The power supplies are located close to where the power supply is available so that the power supply impedance between the noise source and the power source is low because the path length is short. Therefore, the noise voltages are easily discharged into the low impedance (resistance and inductance) of the power supply source.

Memory map decode circuitry 109 of FIG. 3, includes decode circuitry in block 212 of FIG. 1 to decode addresses A0-A15 in order to select various conveniently sized blocks of external memory. For example, CS7, which is defined as "active low", is decoded to be a "low" level when A15 is a "1". This allows addresses A0-A14 to address individual bytes in a 32 kilobyte block of external memory selected by CS7 being "low". Similarly, CS6 is decoded to be "low" in order to select a different block of external memory when A15 is at a "0", and A0-A14 select individual words in that block of external memory. Other combinations of various address bits can be decoded to select other blocks of external memory, allowing the remaining address bits to address words within the selected blocks of external memory, which can include external ROM, external RAM, external registers, and the like. Since the memory map decode circuit 109 decodes the signals produced by microprocessor 201 and selects chip select buffers in block 110 of FIG. 3, memory map decode circuit 109 is most conveniently located between chip select section 110 and the other address buffer section 106B.

Having all of the chip select leads on the same side 102 of the microcomputer chip 200A as the address leads A8-A15 is an important advantage in using the microcomputer 200 as a "core" in a larger monolithic chip such as 300 in FIG. 3A or on a printed circuit board so the chip select conductors CS0-CS7 can be conveniently routed along with the A8-A15 conductors to address external memory and/or external I/O circuitry.

This arrangement avoids the need for routing chip select conductors around the corner of the chip so that selected address outputs and chip select outputs can be logically combined to address certain segments of memory or other peripheral devices. This advantage is applicable to either a larger chip using the topography of microcomputer chip 100A as a core or using microcomputer chip 100A on a printed circuit board. This arrangement also reduces the amount of capacitance of the address bus lines and data bus lines and reduces the total dynamic power consumption of the system.

The WC65C02S microprocessor referred to above is located in section 105, such that its "low order address buffers" (see FIG. 2 of 4,652,992) and its "high order address buffers" are adjacent to sections 106A and 106B, respectively, to effectuate efficient connection thereto.

The 192 byte RAM 205 is located above microprocessor 105 in section 108. Section 205A of SRAM 205 contains the X or column decoder circuitry, and section 205B contains the Y or row decoder. The serial interface buffer of FIG. 1 is located in section 112.

The UART 229 is located directly above serial interface circuitry 233. Priority interrupt control circuitry and an associated register of block 227 (FIG. 1) are located in section 116 above SRAM 205 and to the right of serial interface circuitry 233 and UART 229. The timer control registers of FIGS. 1B and 1C are located in area 115 above area 116.

The 4096 byte ROM is located in section 107, above chip select and I/O Port 3 section 110 and immediately to the right of microprocessor section 201. Section 204A contains the X or row decoder of ROM 204, and section 204B contains the Y or column decoder thereof.

Numeral 203A indicates how A0-A3 conductors of the address bus 203 extend vertically to the right of microprocessor 201 and SRAM 205 to X decoder circuitry 205A, to the right through X decoder circuitry 205A, into register select logic 117, vertically through register select logic 117, and down into the X decode circuitry 204A of ROM 204. Numeral 203B indicates how the A4 conductor of address bus 203 extends vertically along the right hand side of microprocessor 201 into the Y decoder section 205B of RAM 205 and to row decode section 204A of ROM 204. Numeral 203C indicates how address bus conductors A4-A15 of address bus 203 extend along the bottom of microprocessor 201 into Y decode section 204B of ROM 204.

Line 202 in FIG. 3 shows how the data bus extends to the data registers and the I/O data registers in area 106A, corresponding to data registers in block 206 of FIG. 1 along the left hand side of microprocessor 201. The data bus 202 also extends along the lower edge of microprocessor 202 to connect to the data register in block 209 of FIG. 1, and extends vertically along the right hand side of microprocessor 201 into RAM 205, and also horizontally through ROM 204. Data bus 202 further extends along the bottom section of ROM 204 to allow coupling of data to the output buffers in block 110.

Data bus 202 extends vertically along the right hand side of ROM 204, allowing coupling of the data bus to the data bus buffers and the I/O buffers in area 111, and continues upward through section 124, allowing connection to the data register in block 219 of FIG. 1. Data bus 202 then extends along horizontally and to the left through block 125 and block 126, allowing connection to the data registers 222 and 233 of FIG. 1, and also allowing data bus conductors to extend downward through Timer A, Timer M, the bus control and timer control circuitry 120 and 121, and Timers 122 and 123. Data bus conductors also extend into timer control register circuitry in block 115 and extend downward through UART 229A and serial interface buffer circuit 233.

Timer 2, Timer 1, timer control circuitry, bus control register circuitry, Timer M, and Timer A are stacked above ROM section 107 in sections 123, 122, 121, 120, 119, and 118, respectively. Register select logic in area 117 is located above section 107 between the stack of registers 118-123 and sections 108, 116 and 115. Register select logic in block 117 of FIG. 3 is not separately shown in the functional block diagram of FIG. 1, but allows selection of the data register circuitry in blocks 207, 208, 210, 214, 219, 222 and 233.

Data bus buffers and I/O Port 2 circuitry is located in section 111 along edge 103, immediately to the right of ROM 204. I/O Port 4 circuitry and the NMI, IRQ1, IRQ2 and several edge interrupt circuits are located in area 124 along the upper part of edge 103. I/O Port 5 circuitry and the rest of the edge-sensitive interrupt circuits are located in section 125 along edge 104. The I/O Port 6 circuitry and the UART and the circuitry associated with serial interface buffer leads SCLK, SDAT, CHIN, and CHOUT, are located in section 126 along the left part of edge 104. The chip control logic circuitry is located along the upper part of edge 101, to the right of sections 113, 112, and 108.

One reason for locating the ROM in section 204 to the right of microprocessor section 201 is that the size of ROM 204 matches the height of microprocessor 201. Furthermore, the high order address lines can be routed more easily to its decoders than would be the case if it were located above microprocessor 201. Also, the basic structure of the ROM array allows the data bus conductors 202 to be connected directly between the data bus input/output terminals of microprocessor 201 and the data bus terminals of ROM 204. This helps keep the address bus conductors extending into ROM 204 as short as possible and reduces their capacitance. This could not be as easily accomplished if the RAM were located in area 204. Numeral 202 in FIG. 3 indicates where the data bus extends to make contact to the data conductors of RAM 205 and ROM 204.

The serial interface circuitry 233 needs t make connection to the CHOUT, CHIN, SDAT, SCLK conductors and associated buffers in area 126. UART 229 also needs to be connected to data bus 202 and has to be coupled to the TXD, RXD conductors in area 126.

The interrupt controller circuitry in block 116 needs to be centrally located so it can be efficiently connected to interrupt signals from UART 229, the serial interface buffer 223, the edge interrupt inputs of area 125 and area 124 and the IRQ1, IRQ2, and NMI of area 124. The central location of the interrupt controller circuitry in area 116 is needed to reduce the amount of capacitance and the amount of chip area required for such routing. Also, outputs from the interrupt controller circuitry 116 need to be routed to microprocessor 201, and the distance and capacitance of those lines needs to be minimized. The timers in areas 118, 119, 120, 121, 122, and 123 interact with the priority interrupt circuitry in area 116 and need to be located as close as possible to it, and hence are located to the left of area 124 and below area 125 in which many of the interrupt inputs and Port 4 I/O buffers are located.

At this point, it should be noted that for microcomputer 200 to function as a "core" of the larger computer system chip such as the one shown in FIG. 3A, it was recognized, as a result of the unsuitability of the above-mentioned W65C124 prior art microcomputer as a "core" microcomputer, that all of the edge interrupt circuitry should be in contiguous peripheral areas of the microcomputer chip so that all interrupt conductors could be routed conveniently to external interrupt circuitry that would be adjacently located, in order to avoid severe interrupt conductor routing difficulties.

It was recognized that in a larger microcomputer system using a microcomputer "core", it would usually be most convenient, from the viewpoint of routing of address and data bus conductors, to have all of the external memory and addressable external I/O blocks adjacent to a particular edge of the microcomputer 200 and to avoid the need to route data bus and address bus conductors to opposite sides of the microcomputer core. This is achieved by placement of interrupt circuitry on an opposite side of the microcomputer core and also placement of other circuitry, such as communications circuitry that would communicate with UART 229 and serial interface buffer 223 on a side of the microcomputer core 200 opposite to the memory, I/O, and register logic. The desire to locate all of memory, addressable I/O, and register circuitry in a common area toward one side of the microcomputer core led to placement of the chip select outputs in line along the periphery of microcomputer 200A adjacent to the high order address buffers in section 106B. This led to placement of the memory map decode circuitry in area 109 to achieve the desired memory segmentation. These considerations also led to placement of buffer areas 106A, 106B, 109, 110, 111, 124, 125, and 126 around the periphery of microcomputer chip 200A as shown in FIG. 3.

The inclusion of the UART, additional timers, and many more I/O port conductors than in the prior art W65C124 microcomputer led to a need for substantially increased chip control functions and a greatly expanded bus control 120 register and the need to position it so as not to interfere with the locations of other main functional blocks and to allow optimal communicating with them. The other above-mentioned system considerations for an optimum core microcomputer, along with the desirability of providing power-saving dual oscillator functions previously described, led to placement of the chip control logic in area 235 along the upper part of edge 101.

The register select logic is located in section 117 to the right of RAM section 108, priority interrupt control circuit 116, and timer control register section 115 because a central location is needed to allow selection of registers to both its right and its left. The stack of timers are located in sections 118–123 because they all have similar logic configurations and cell sizes and they fit well together.

The D0-D7 data bus buffer circuitry is located adjacent to the I/O Port 2 peripheral circuitry in section 111 of microcomputer chip 100A, as shown in FIG. 3 because it needs to be close to address buses, and needs to be proximate to the microprocessor 201, ROM 204, and SRAM 205.

FIG. 3A shows a large computer system chip 300 that includes the topography of microcomputer chip 200A of FIG. 3 as a "core". Chip 300 includes an "external" memory system 301 located along bottom edge 300A of chip 200. Memory system 301 abuts address buffer sections 106A and 106B, memory map decode section 109, chip select section 110, and data bus buffer section 111 of microcomputer 200A. This configuration of chip 200A effectuates optimum routing of address lines A0–A15, various ones of chip select lines CS0-CS7, and data bus lines D0-D7 through external memory system 201, and allows very effective segmentation of external memory 201 and very efficient addressing of selected segments by microcomputer 100A. A serial communications system 302 is located in the upper left corner of chip 300, abutting chip control logic 235 in microcomputer core 200A. An interrupt subsystem 303, implemented as an ASIC (application specific integrated circuit) is located in the upper righthand corner of chip 300, and abuts sections 125 and 124 of microcomputer 300A, where all of the above-described edge-sensitive interrupt circuitry and level-sensitive interrupt circuitry is located.

Figure 5A:
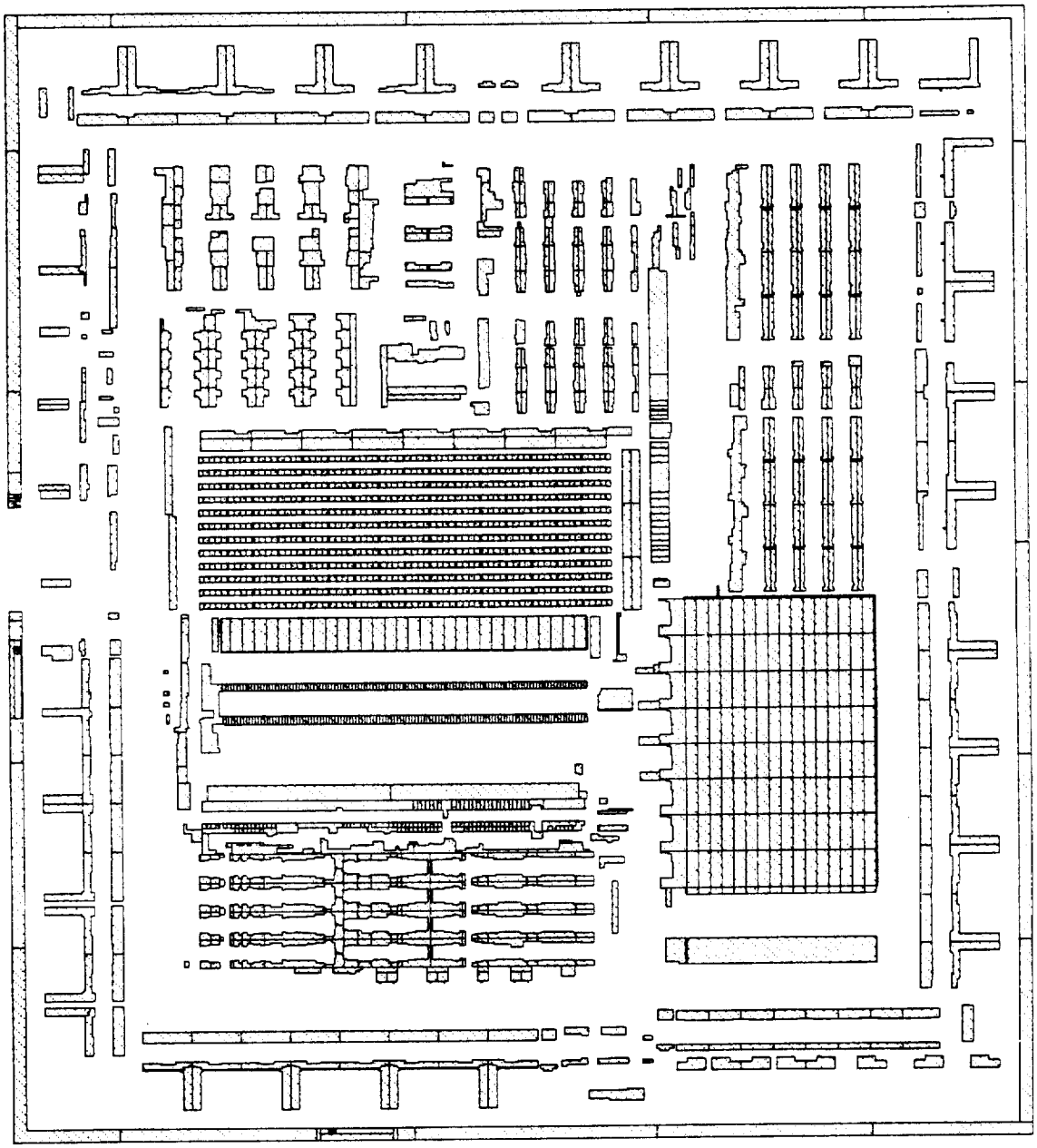

FIG. 5A is a scale plot of the mask layer used to form P well diffusions in the manufacture of microcomputer 200. All of the closed areas in the mask layer would be black, of course, but for convenience, the same information has been plotted on paper.

Figure 5B:
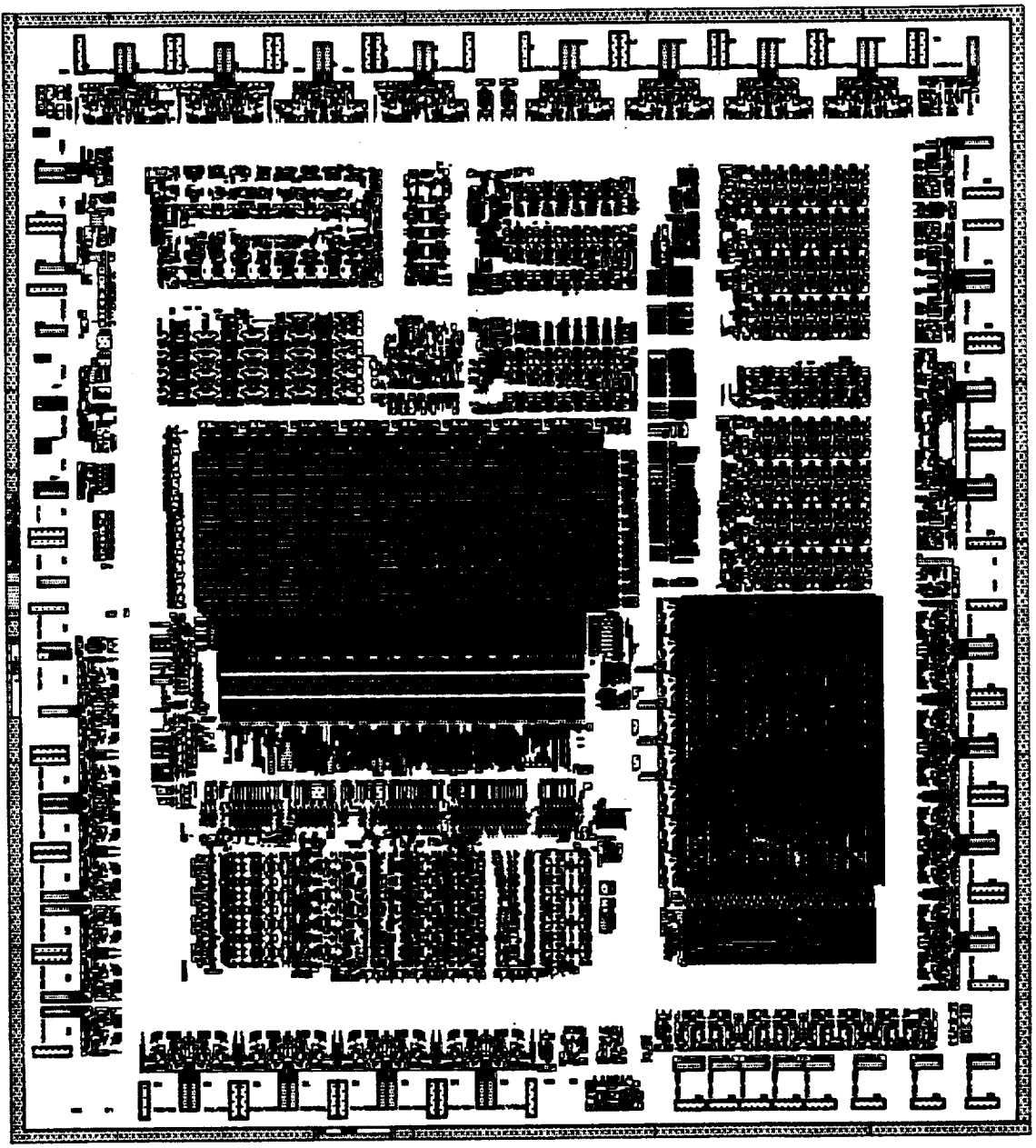

FIG. 5B is a scale computer plot of the mask used for forming the P-type source and drain regions and the N-type source and drain regions in the manufacture of microcomputer 200.

Figure 5C:
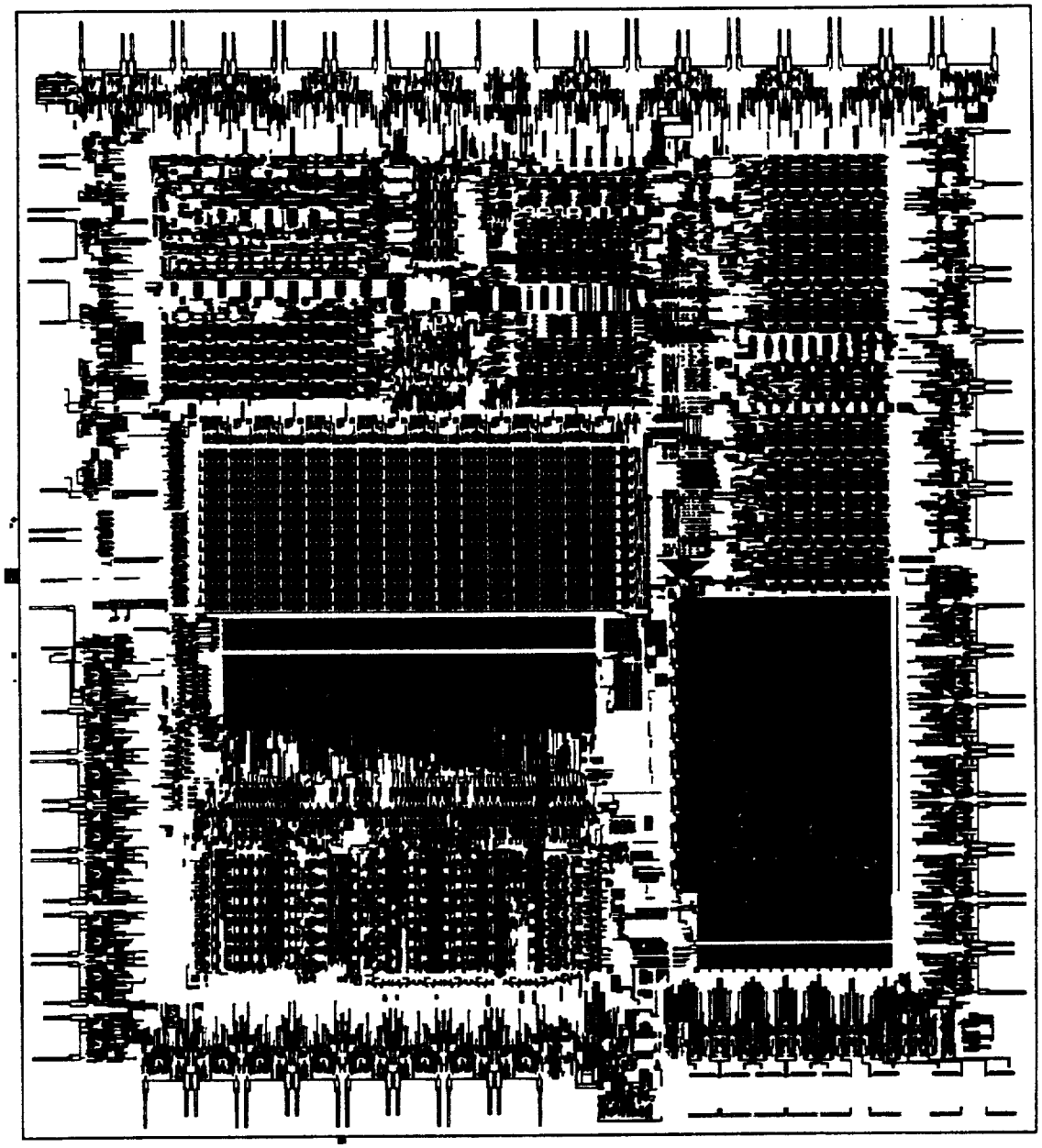
Figure 5C:
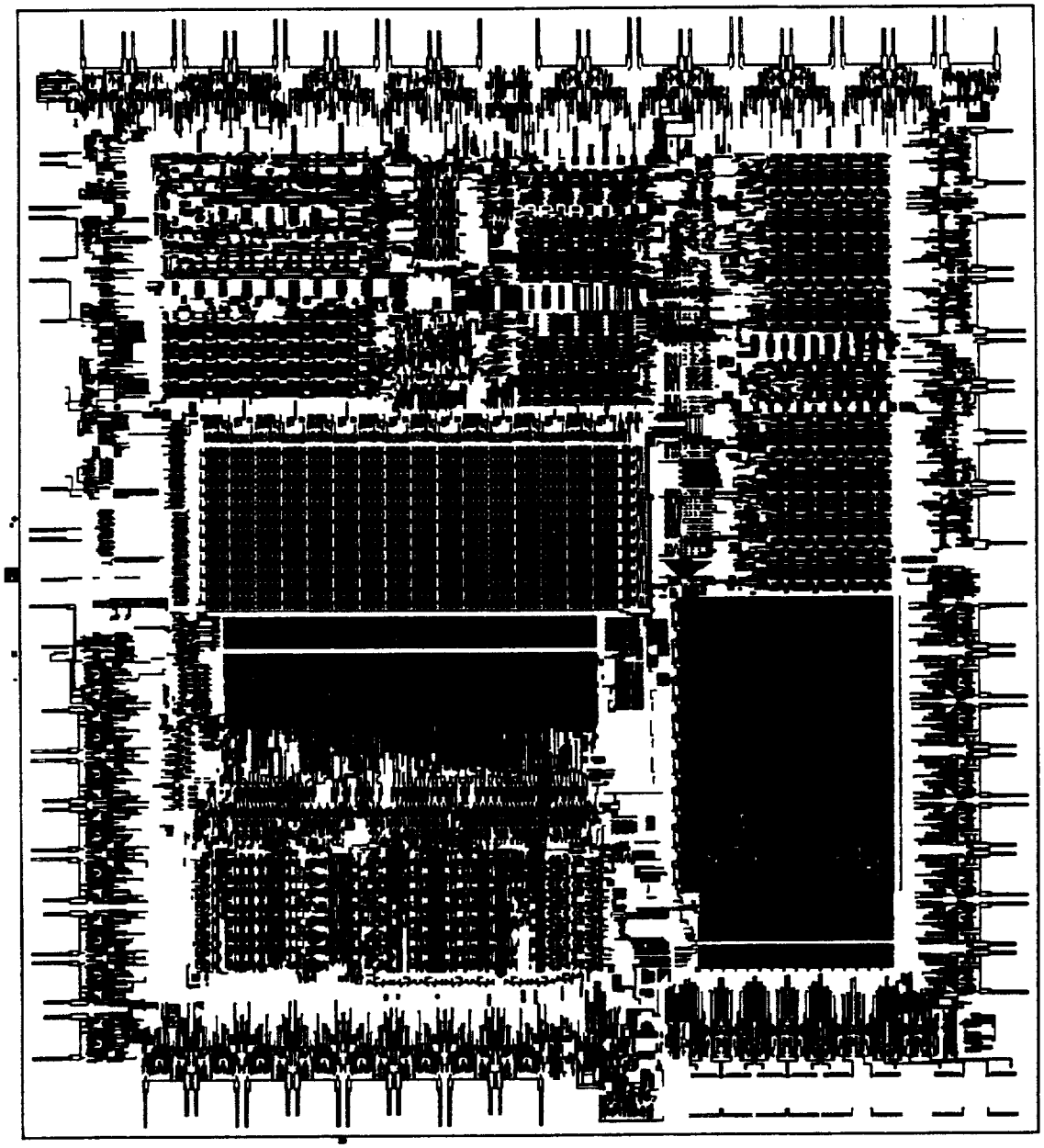

FIG. 5C is a scale computer plot of the mask used in patterning the polycrystalline silicon layer in the manufacture of microcomputer 200.

FIG. 5D is a computer plot of the mask defining the N+ implants defining source and drain regions of N-channel MOSFETs in microcomputer 200.

Figure 5E:
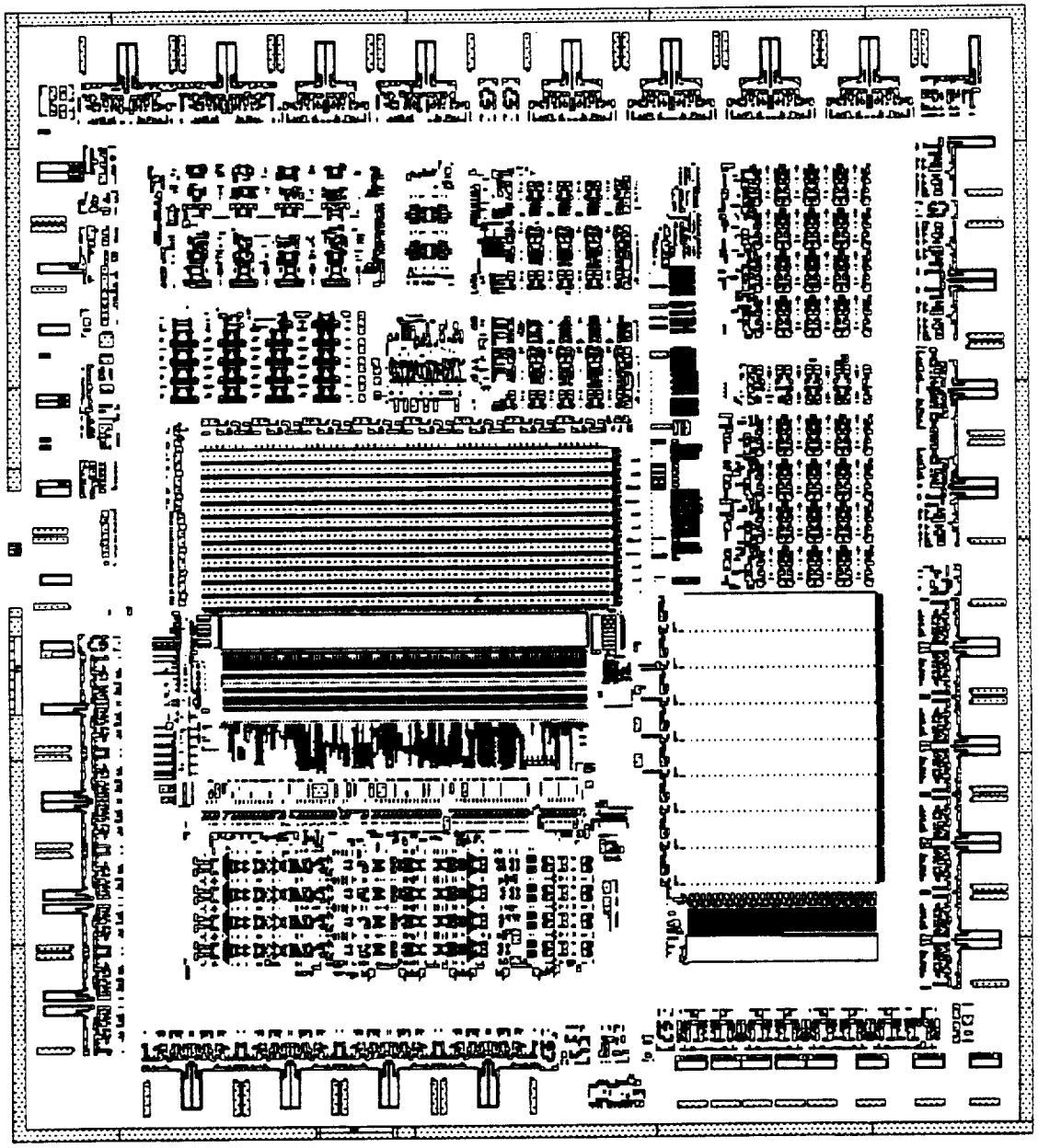

FIG. 5E is a scale computer plot of the mask defining the P+ implant regions for the sources and drains of P-channel MOSFETs in microcomputer 200.

Figure 5F:
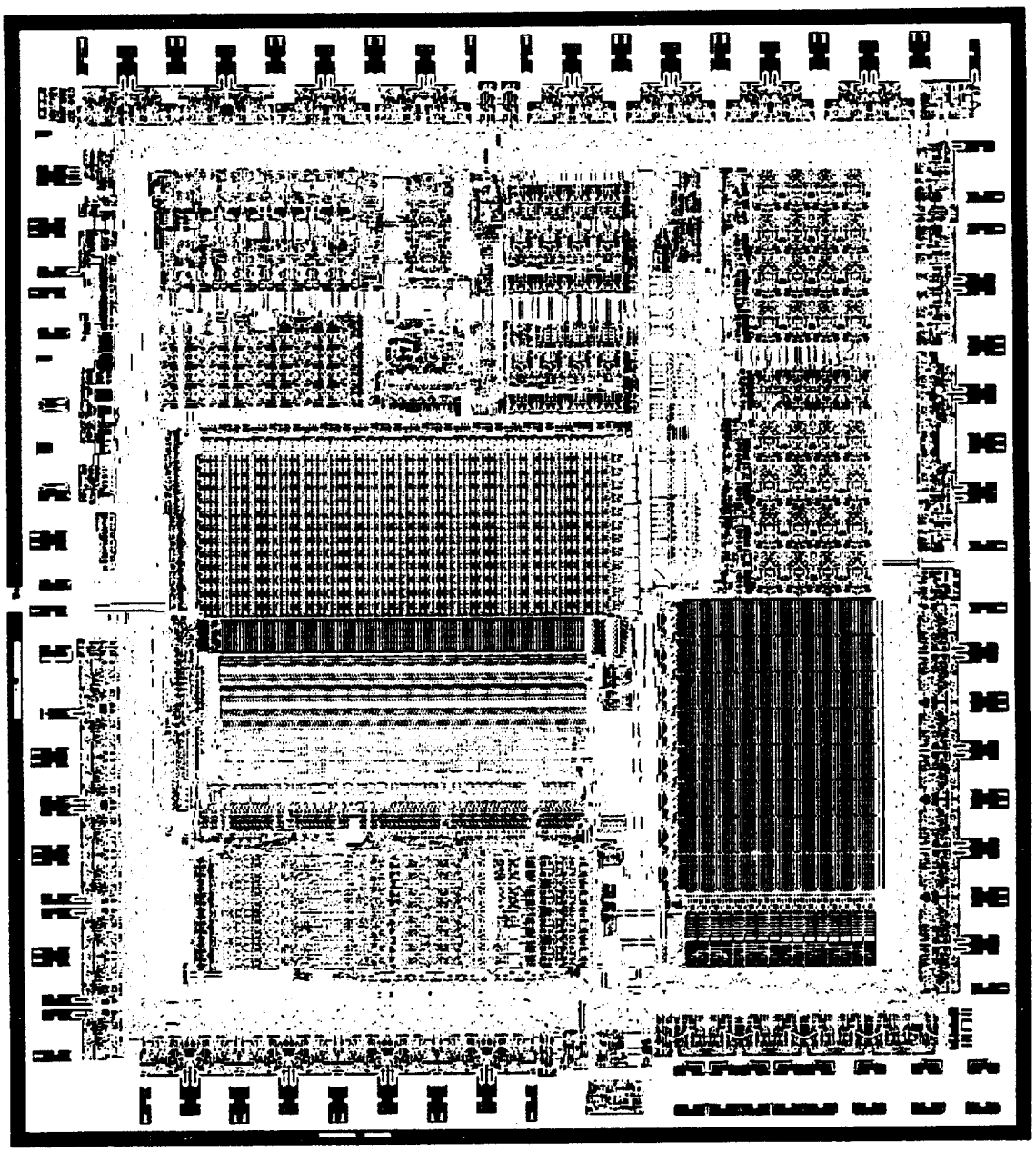

FIG. 5F is a scale computer plot showing all of the metal-to-silicon and metal-to-polycrystalline silicon contacts in microcomputer 200.

Figure 5G:
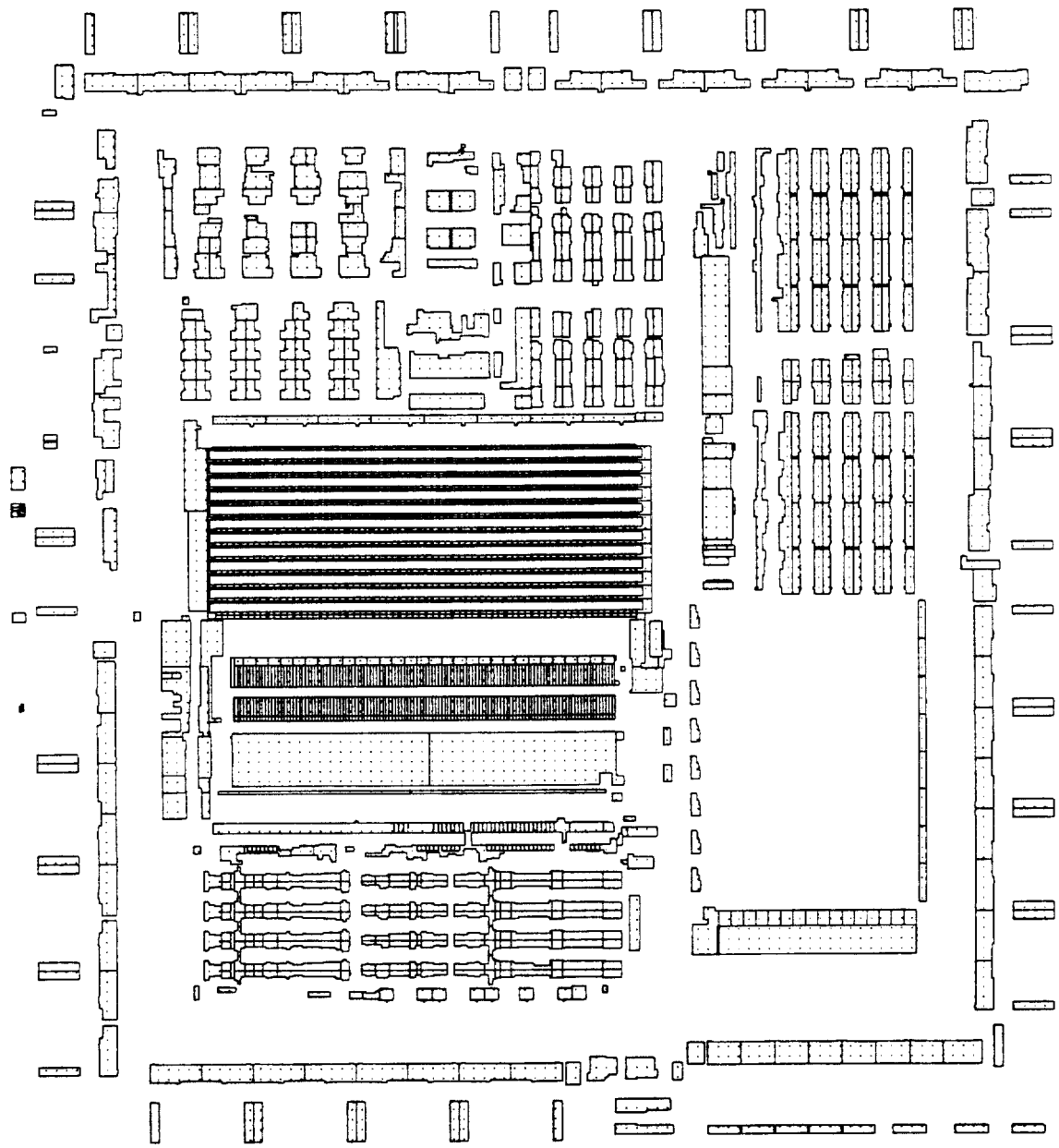

FIG. 5G is a scale computer plot identifying the locations of the N-type well regions formed during the manufacture of microcomputer 200.

Figure 5H:
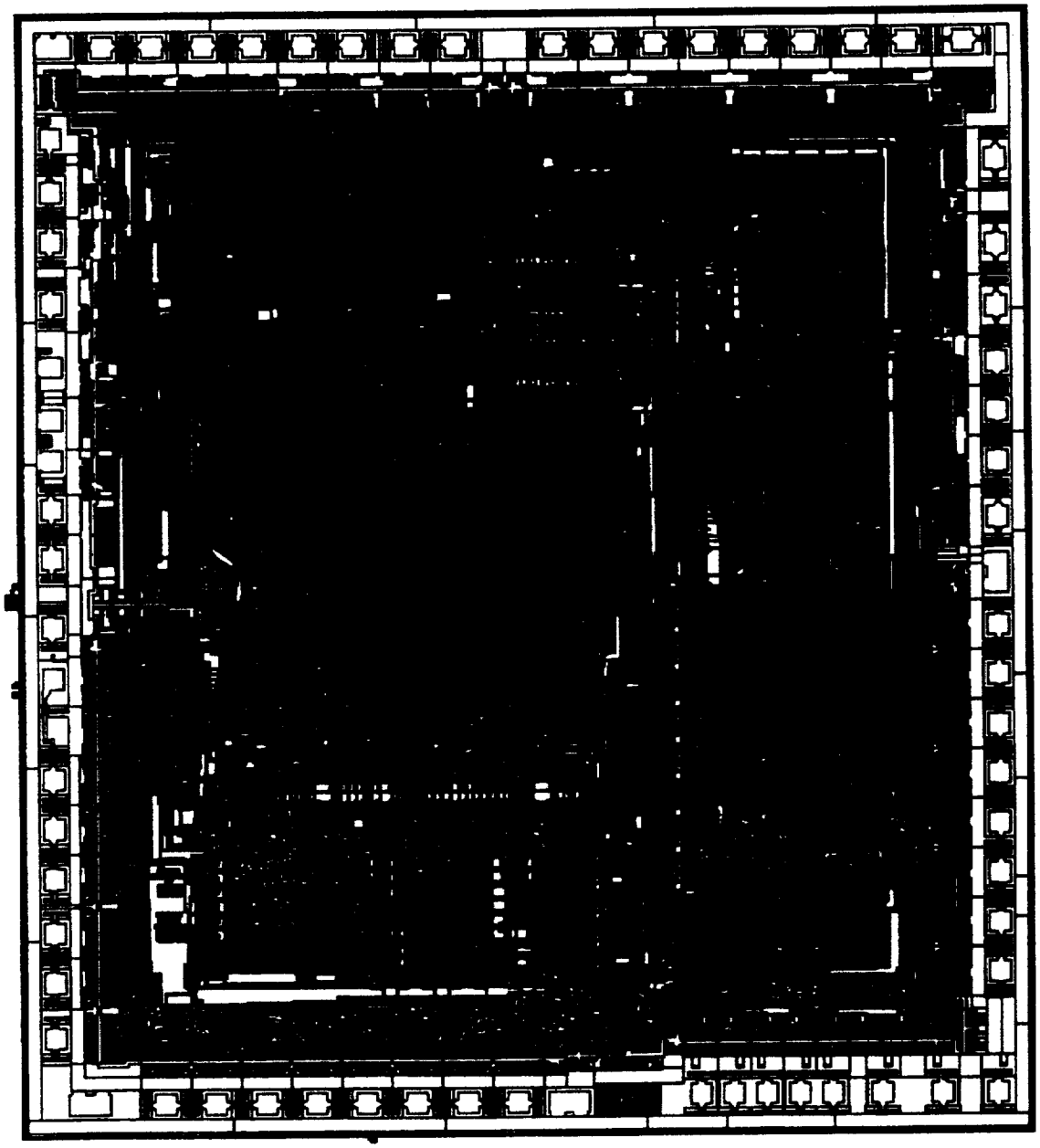

FIG. 5H is a scale computer plot of the metal layer formed in the manufacture of microcomputer 200.

While the invention has been described with reference to a particular embodiment thereof, those skilled in the art will be able to make the various modifications to the described embodiments of the invention without departing from the true spirit and scope of the invention.

What is claimed is:

1. A CMOS integrated circuit microcomputer including first, second, third, and fourth successive edges, the microcomputer comprising in combination:
   (a) a microprocessor including (i) address output buffer means located along a lower left edge and a bottom edge of the microprocessor, (ii) data bus buffer means located along a right edge of the microprocessor, and (iii) a plurality of interrupt circuits located along an upper edge of the microprocessor;
   (b) a plurality of low order address buffer circuits located along a lower part of the first edge, adjacent to the address output buffer means of the microprocessor;
   (c) a plurality of high order address buffer circuits located along a left part of the second edge, adjacent to the address buffer means of the microprocessor;
   (d) chip selection output circuitry located along a right part of the second edge;
   (e) a plurality of data bus buffer circuits located along a lower part of the third edge;
   (f) a plurality of interrupt circuits located along an upper part of the third edge;
   (g) a plurality of interrupt circuits located along a right part of the fourth edge;
   (h) a first memory circuit located between the data bus buffer circuits and the microprocessor above the chip select output circuit means;
   (i) a second memory circuit located directly above and adjacent to the microprocessor;
   (j) a first group of interface circuits disposed between the fourth edge and the second memory circuit;
   (k) a plurality of I/O interface circuits various ones of which are located along the fist, second, third, and fourth edges among the low order and high order address buffer circuits, the data bus buffer circuits, the interrupt circuits, and the first group of interface circuits, respectively, various ones of the I/O interface circuits being multiplexed with a plurality of external terminals of the low order and high order address buffer circuits, the data bus buffer circuits, the interrupt circuits, and the first group of interface circuits, respectively; and
   (l) chip control circuit means located along an upper part of the first edge for operatively coupling the microprocessor to the first and second memory circuits, the first group of interface circuits, the chip selection output circuitry, the high and low order address buffer circuits, the data bus buffer circuits, and the I/O interface circuits.

2. The CMOS integrated circuit microcomputer of claim 1 wherein the first memory is a read only memory and the second memory is a random access memory.

3. The CMOS integrated circuit microcomputer of claim 2 wherein the first group of interface circuits includes a UART.
   (f) a plurality of interrupt circuits located along an upper part of the third edge;
   (g) a plurality of interrupt circuits located along a right part of the fourth edge;
   (h) a first memory circuit located between the data bus buffer circuits and the microprocessor above the chip select output circuit means;
   (i) a second memory located directly above and adjacent to the microprocessor;
   (j) a first group of interface circuits disposed between the fourth edge and the second memory;
   (k) a plurality of I/O interface circuits located along the first, second, third, and fourth edges among the low order and high order address buffer circuits, the data bus buffer circuits, the interrupt circuits, and the first group of interface circuits, and multiplexed with a plurality of external terminals, respectively, of the low order and high order address buffer circuits, the data bus buffer circuits, the interrupt circuits, and the first group of interface circuits;

4. The CMOS integrated circuit microcomputer of claim 3 including a second group of interface circuits disposed between an upper part of the third edge and the first group of interface circuits, wherein the second group of interface circuits includes a plurality of timers located adjacent to the I/O interface circuits and interrupt circuits that are disposed along the upper part of the third edge.

5. The CMOS integrated circuit microcomputer of claim 4 wherein the chip selection circuit means includes a plurality of decoded chip select outputs and memory map decoding means for decoding an internal address bus connected to address terminals of the microprocessor, in order to produce a plurality of individual chip select output signals for selecting predefined-size blocks of memory space.

6. The CMOS integrated circuit microcomputer of claim 5 including a plurality of peripheral output circuits located adjacent tot eh second edge with the chip selection output circuitry.

7. The CMOS integrated circuit microcomputer of claim 1 wherein each of the I/O interface circuits has an I/O terminal, and a plurality of static bus holding circuits each having an input and an output both connected to a respective I/O terminal, each bus holding circuit including first and second CMOS inverters, an input of the first CMOS inverter and an output of the second CMOS inverter being connected to the same I/O terminal, an output of the first CMOS inverter being connected to an input of the second CMOS inverter.

8. The CMOS integrated circuit microcomputer of claim 1 including a plurality of bonding pads arranged in the order RES (reset), WE (write enable), RUN/SYNC, FCLKO (fast clock output), FCLK (fast clock), BE/RDY (bus enable/ready), CLK (slow clock), CLKO (slow clock output), PHI2 (clock output), P00/A00, P01/A1, P02/A2, P03/A3, P04/A4, P05/A5, P06/A6, P07/A7, $V_{SS}$, P10/A8, P11/A9, P12/A10, P13/A11, P14/A12, P15/A13, P16/A14, P17/A15,
VDD, P30/CS0, P31/CS1, P32/CS2, P33/CS3,
P34/CS4, P35/CS5, P36/CS6, P37/CS7, P20/D0,
P21/D1, P22/D2, P23/D3, P24/D4, P25/D5, P26/D6,
P27/D7, V$_{SS}$, P40/NMI, p41/IRQ1, P42/IRQ2, P43,
P44/PE44, P45/PE45, P46/NE46, P47/NE47,
P50/PE50, PE51/PE51, PE52/NE52, P53/NE53,
P54/PE54, P55/PE55, P56/PE56, P57/NE57,
P60/RXD/TIN, P61/TXD/TOUT, P62, P63,
P64/SCLK, P65/SDAT, P66/CHIN, P67/CHOUT.

9. The CMOS integrated circuit microcomputer of claim 1 including:
 a fast clock oscillator having a programmed stop input and a fast clock output;
 a slow clock oscillator having a slow clock output;
 a synchronizing circuit means having a first input connected to the fast clock output of the fast clock oscillator circuit and a second input connected to the slow clock output of the slow clock oscillator, a clock select input, and a clock enable output conductor for producing a clock enable signal on the clock enable output conductor, the clock enable signal being synchronized with the fast clock signal produced by the fast clock oscillator circuit if the clock select input is at a first logic level, the clock enable signal having the same frequency as and being synchronized with the slow clock signal produced by the slow clock oscillator if the clock select signal is at a second logic level;
 gating circuit means coupled to the fast clock output of the fast clock oscillator and the slow clock output of the slow clock oscillator for producing a selectable speed clock signal that has the same frequency as and in synchronized with the fast clock signal produced by he fast clock oscillator circuit if a clock select signal on the clock select input is at the first logic level and has the same frequency as and is synchronized with the slow clock signal produced by the slow clock oscillator if the clock select signal is at the second logic level.

10. The CMOS integrated circuit microcomputer of claim 9 wherein the synchronizing circuit includes four gated latch circuits connected in series to allow an internal signal propagation in response to the fast clock signal to undergo enough transitions to occupy one time interval at least equal to the width of a pulse of the slow clock signal.

11. The CMOS integrated circuit microcomputer of claim 3 wherein the UART includes a transmitter circuit enabled by a first bit of a control and status register and a receiver circuit enabled by a second bit of the control and status register.

12. The CMOS integrated circuit of claim 1 including a plurality of bus holding circuits, each bus holding circuit including a binary latch circuit having two states and having a high output impedance in either state, each latch having both an input terminal and an output terminal connected to one of the external terminals, respectively, of the I/O interface circuits.

13. A CMOS integrated circuit microcomputer system, comprising in combination:
 (1) a microcomputer including first, second, third, and fourth successive edges, the microcomputer including
  (a) a microprocessor, the microprocessor including
   (i) address output buffer means located along a lower left edge of the microprocessor and a bottom edge of the microprocessor, (ii) data bus buffer means located along a right edge of the microprocessor, and (iii) a plurality of interrupt circuits located along an upper edge of the microprocessor;
  (b) a plurality of low order address buffer circuits located along a lower part of the first edge of the microcomputer, adjacent to the address output buffer means of the microprocessor;
  (c) a plurality of high order address buffer circuits located along a left part of the second edge of the microcomputer, adjacent to the address buffer means of the microprocessor;
  (d) a plurality of data bus buffer circuits located along a lower part of the third edge of the microcomputer;
  (e) a plurality of interrupt circuits located along an upper part of the third edge of the microcomputer;
  (f) a plurality of interrupt circuits located along a right part of the fourth edge of the microcomputer;
  (g) a first group of interface circuits disposed between the fourth edge of the microcomputer and the microprocessor;
  (h) a plurality of I/O interface circuits various ones of which are located along the first, second, third, and fourth edges of the microcomputer among the low order and high order address buffer circuits, the data bus buffer circuits, the interrupt circuits, and the first group of interface circuits, respectively, various ones of the I/O interface circuits being multiplexed with a plurality of external terminals of the low order and high order address buffer circuits, the data bus buffer circuits, the interrupt circuits, and the first group of interface circuits, respectively;
  (i) chip control circuit means located along an upper part of the first edge of the microcomputer for operatively coupling the microprocessor to the first group of interface circuits, the chip selection output circuitry, the high and low order address buffer circuits, the data bus buffer circuits, and the I/O interface circuits;
 (2) an external memory system disposed along a lower portion of the first edge of the microcomputer, entirely along the second edge of the microcomputer, and along a lower portion of the third edge of the microcomputer; and
 (3) an interrupt and I/O system disposed along the upper portion of the third edge of the microcomputer and the right portion of the fourth edge of the microcomputer, and coupled to the I/O and interrupt terminals of the microcomputer.

14. The CMOS integrated circuit microcomputer system of claim 13 further including a serial communication system disposed along a left portion of the fourth edge of the microcomputer and connected to terminals of the I/O interface circuits and terminals of the serial communication system.

15. The CMOS integrated circuit microcomputer system of claim 13 wherein the microcomputer includes chip selection output circuitry located along a right part of the second edge of the microcomputer, a first memory circuit located between the data bus buffer circuits and the microprocessor have the chip select output circuit means, and a second memory located directly above and adjacent to the microprocessor.

* * * * *